(12) United States Patent
Tang

(10) Patent No.: US 8,443,030 B1
(45) Date of Patent: May 14, 2013

(54) PROCESSING OF FLOATING POINT MULTIPLY-ACCUMULATE INSTRUCTIONS USING MULTIPLE OPERAND PATHWAYS

(75) Inventor: Hua Tang, Foster City, CA (US)

(73) Assignee: Marvell International Ltd., Hamilton (BM)

( * ) Notice: Subject to any disclaimer, the term of this patent is extended or adjusted under 35 U.S.C. 154(b) by 1276 days.

(21) Appl. No.: 12/045,609

(22) Filed: Mar. 10, 2008

Related U.S. Application Data

(60) Provisional application No. 60/894,043, filed on Mar. 9, 2007.

(51) Int. Cl.
*G06F 7/38* (2006.01)

(52) U.S. Cl.
USPC .......................................... 708/501; 708/495

(58) Field of Classification Search ........................ None
See application file for complete search history.

(56) References Cited

U.S. PATENT DOCUMENTS

| | | | |
|---|---|---|---|
| 5,941,984 A * | 8/1999 | Mohri et al. | 712/218 |
| 6,098,166 A | 8/2000 | Leibholz et al. | 712/216 |
| 6,112,019 A * | 8/2000 | Chamdani et al. | 712/214 |
| 2004/0044716 A1 * | 3/2004 | Colon-Bonet | 708/490 |

FOREIGN PATENT DOCUMENTS

| | | |
|---|---|---|
| EP | 0 515 166 | 11/1992 |

* cited by examiner

*Primary Examiner* — Michael D Yaary

(57) ABSTRACT

Floating point multiply-accumulate (FMAC) instructions are processed by a logic circuit. A register file stores operands for a FMAC instruction. A multiplier multiplies an operand S1 and an operand S2 from the register file to produce a resultant operand St. An adder adds two operands St and Sd (which is the result of a prior accumulation) to produce the result Sd of the FMAC instruction. A reorder buffer (ROB) stores and reorders entries corresponding to FMAC instructions, and a hazard-checking block detects whether the FMAC instruction contains a potential hazard. A selector selects an output value from the ROB. The operands St and Sd can be supplied via one of a plurality of paths based on a priority of the paths, and the priority for the paths is based in part on output from the hazard-checking block and contents of the ROB.

15 Claims, 6 Drawing Sheets

FMAC Sd, S1, S2 = FMUL St, S1, S2 ; FADD Sd, Sd, St

| Sd | 1 | 2 | 3 | 4 | 4 | 4 |
|---|---|---|---|---|---|---|
| St | c | c | ⓒ | | | |
| | [b] | c | ⓒ | | | |
| | [a] | [b] | ⓒ | | | |
| | | [a] | ⓑ | c | | |
| | | | ⓐ | b | c | |
| | | | | ⓐ | b | c |

| St | a | b | c | c | c | |
|---|---|---|---|---|---|---|
| Sd | ④ | 4 | 4 | | | |
| | ③ | 4 | | | | |
| | [2] | ③ | 4 | | | |
| | [1] | [2] | ③ | 4 | | |
| | | [1] | 2 | ③ | 4 | |
| | | | 1 | 2 | ③ | |

FIG. 2

PROCESSING OF FLOATING POINT MULTIPLY-ACCUMULATE INSTRUCTIONS USING MULTIPLE OPERAND PATHWAYS

CROSS-REFERENCE TO RELATED APPLICATION

This application claims the benefit of U.S. Provisional Patent Application No. 60/894,043, filed Mar. 9, 2007, the contents of which are hereby incorporated by reference as if fully stated herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present disclosure relates to processing of floating point multiply-accumulate instructions using multiple operand pathways.

BACKGROUND

Floating point multiply-accumulate (FMAC) instructions are commonly used by microprocessors and microcontrollers. For example, mathematical matrix operations for graphics display often require several FMAC operations.

One important consideration in multiply-accumulate instructions is data dependency. Specifically, a multiply-accumulate instruction depends on operands whose values may change. In the case of parallel (pipelined) instruction processing, however, it cannot be assumed that each instruction is fully executed before execution of the subsequent instruction begins. Thus, an instruction may use incorrect operand values if the values have not settled from previous instructions. A potential error caused by data dependency is called a "hazard". To address hazards, multiply-accumulate operations ordinarily delay until the values for each operand have settled from previous instructions. However, this solution leads to reduced processing speed. While other methods have been devised to address data dependency, these methods ordinarily require extra hardware such as large buffers or adders, adding to cost and space requirements.

SUMMARY

The foregoing situation is addressed by providing processing of floating point multiply-accumulate instructions using a plurality of operand paths.

Thus, in one aspect, floating point multiply-accumulate (FMAC) instructions are processed by a logic circuit. A register file stores operands for a FMAC instruction. A multiplier multiplies an operand S1 and an operand S2 from the register file to produce a resultant operand St. An adder adds two operands St and Sd to produce a resultant operand that represents a result of the FMAC instruction. A reorder buffer (ROB) stores and reorders entries corresponding to FMAC instructions, and a hazard-checking block detects whether the FMAC instruction contains a potential hazard. A selector selects an output value from the ROB. The operands St and Sd can be supplied via one of a plurality of paths based on the priority of the paths, and the priority of the paths is based in part on output from the hazard-checking block and entries in the ROB.

By virtue of the above arrangement, data dependencies can be accounted for in FMAC instructions while reducing the need for large and/or expensive extra hardware.

In another aspect, floating point multiply-accumulate (FMAC) instructions are processed. A storing means stores operands for a FMAC instruction, a multiplication means multiplies an operand S1 and an operand S2 from the register file to produce a resultant operand St, an addition means adds two operands St and Sd to produce a resultant operand that represents a result of the FMAC instruction, a reordering means stores and reorders entries corresponding to FMAC instructions, a hazard-checking means detects whether the FMAC instruction contains a potential hazard, and a selecting means selects an output value from the reordering means. The operands St and Sd can be supplied via one of a plurality of paths based on the priority of the paths, and the priority of the paths based in part on output from the hazard-checking block and entries in the ROB.

In still another aspect, a computer-executable program stored on a computer-readable medium causes a computer (or a processor) to process floating point multiply-accumulate (FMAC) instructions. The program causes the computer to configure a register file to store operands for a FMAC instruction. The program also causes the computer to configure a multiplier to multiply an operand S1 and an operand S2 from the register file to produce a resultant operand St, an adder to add two operands St and Sd to produce a resultant operand that represents a result of the FMAC instruction, a reorder buffer (ROB) to store and reorder entries corresponding to FMAC instructions, a hazard-checking block to detect whether the FMAC instruction contains a potential hazard, and a selector to select an output value from the ROB. The operands St and Sd can be supplied via one of a plurality of paths based on the priority of the paths, and the priority for the paths is based in part on output from the hazard-checking block and entries in the ROB.

A more complete understanding can be obtained by reference to the following detailed description and to the attached drawings.

BRIEF DESCRIPTION OF THE DRAWINGS

FIG. 2 is graphical depiction of relationships between operand pathways.

DETAILED DESCRIPTION

Figure 1:
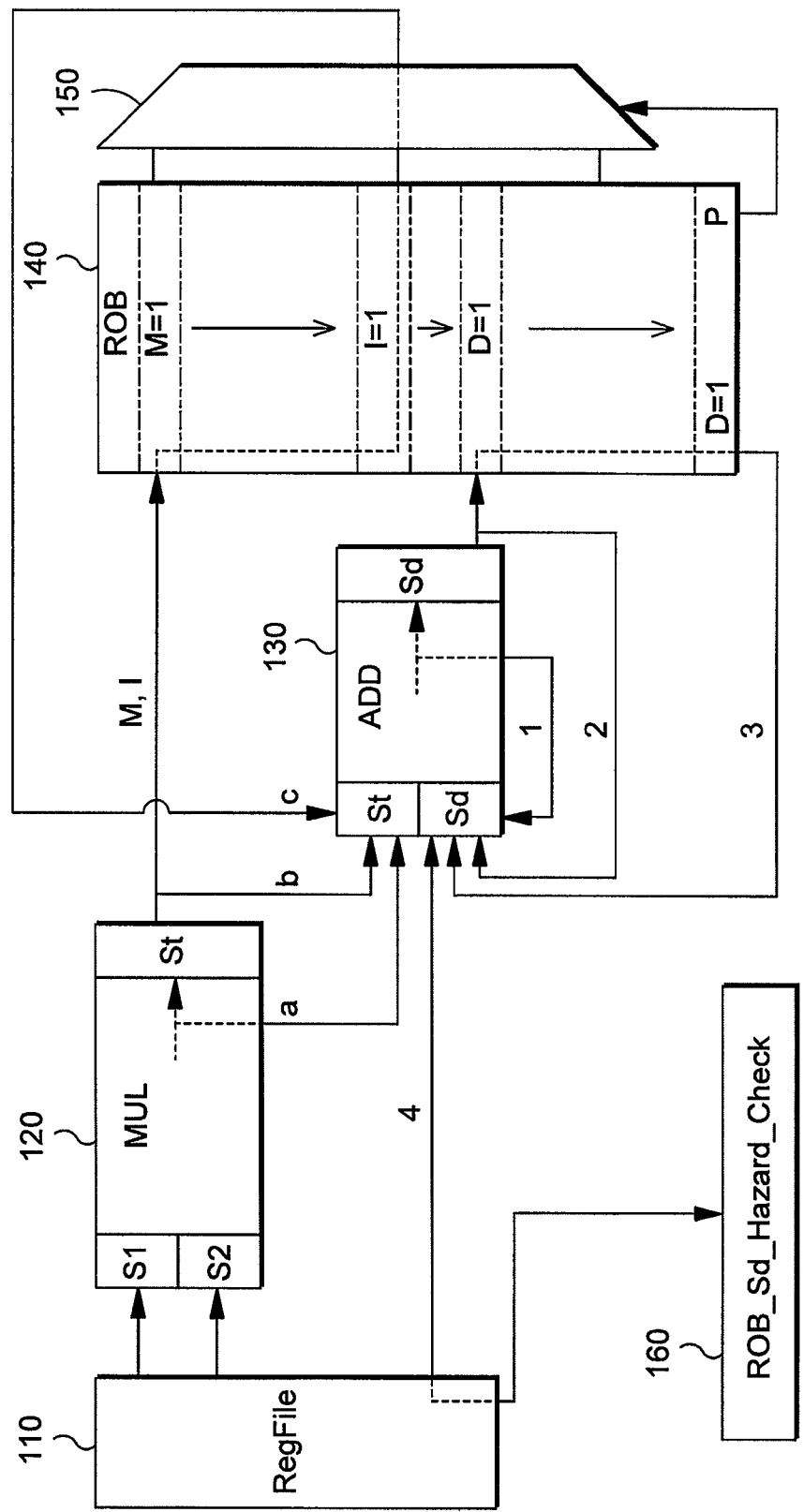
FIG. 1 is a block diagram of an example logic circuit for processing FMAC instructions.

FIG. 1 is a block diagram of an example logic circuit for processing floating point multiply-accumulate (FMAC) instructions.

As shown in FIG. 1, the logic circuit includes register file 110 ("regfile"), multiplier 120 ("MUL"), adder 130 ("ADD"), reorder buffer 140 ("ROB"), selector 150, and hazard-checking block 160 ("ROB_Sd_hazard_check").

An FMAC operation is defined by FMAC (Sd, S1, S2)=FMUL (St, S1, S2); FADD (Sd, Sd, St). Thus, each FMAC operation is comprised of a multiply of operands S1 and S2 to yield St, followed by an addition of operands St and Sd to yield a new Sd.

Register file 110 stores data for other units (or logic blocks) in the logic circuit. With particular regard to FMAC instructions, register file 110 stores operands for each instruction. For example, register file 110 stores the operands S1 and S2 along with corresponding values such as "3" or "20". Register files are commonly implemented in hardware using fast static RAMs with multiple ports, although other hardware implementations are possible.

Multiplier 120 is a subcircuit for multiplying two values to produce a resultant value. As shown in FIG. 1, multiplier 120 loads the operands S1 and S2 from register file 110, and multiplies the operands S1 and S2 to produce the resultant operand St. The resultant operand St is transmitted to other logic blocks as needed.

Multiplication in multiplier 120 occurs over several clock cycles. While the number of clock cycles required could vary widely based on design, in this example embodiment multiplier 120 will be considered to require 5 total clock cycles from start to storage of the resultant operand St in a register buffer of multiplier 120.

Although 5 total clock cycles are required for multiplier 120 to store operand St (or the value of operand St) in the register buffer, operand St is actually available before the end of the $5^{th}$ clock cycle. More specifically, multiplier 120 stores operand St in the register buffer during the $5^{th}$ clock cycle. Thus, operand St is actually ready after the $4^{th}$ clock cycle. Accordingly, in the present example logic circuit, multiplier 120 is configured to transmit operand St to adder 130 at the same time multiplier 120 transfers St to the register buffer. Operand St can therefore be obtained from multiplier 120 after the $4^{th}$ clock cycle and transmitted directly to adder 130.

Adder 130 is a subcircuit for performing addition of two values to produce a resultant value. As shown in FIG. 1, adder 130 adds the operands St and Sd to produce the resultant operand Sd. Thus, the prior Sd value is overwritten by a new Sd value, which is then output or transmitted to other units (or logic blocks) of the logic circuit as needed.

As shown in FIG. 1, multiple paths are available to provide the input operands St and Sd to adder 130. More specifically, operand St can be obtained via one of paths "a", "b" or "c", and operand Sd can be obtained via one of the paths "1", "2", "3" or "4". Each path has a priority, and a pathway is selected based on a current state of the logic circuit. This process is described more fully below.

As with multiplier 120, addition in adder 130 requires multiple clock cycles. While the number of clock cycles could vary widely based on the design of adder 130, in this example embodiment adder 130 will be considered to require 5 total clock cycles from start to storage of the operand Sd in a register buffer of adder 130.

While 5 total clock cycles are required for adder 130 to store the resultant value of operand Sd in the register buffer, operand Sd is actually available before the end of the $5^{th}$ clock cycle. More specifically, operand Sd is ready after the $4^{th}$ clock cycle. Thus, operand Sd can be obtained from adder 130 after the 4th clock cycle and transmitted directly to the input of adder 130 as well as the register buffer of adder 130.

Reorder buffer (hereafter "ROB") 140 is a First-In First-Out (FIFO) buffer for arranging instructions back in an original program order if the instructions have finished execution out of order. In particular, by ensuring that results from instructions are written back to register file 110 based on the original program order of the instructions, register file 110 can be updated in the correct order even though the instructions may execute out of order.

More specifically, a new entry is written in ROB 140 upon dispatch of a FMAC instruction. Thus, each instruction has a corresponding entry. Each instruction entry maintains the values of operands St and Sd for the instruction, along with other bits and flags which will be described in more detail below. While the instruction executes, resultant values for operands St and Sd are temporarily written to ROB 140. For example, multiplier 120 writes a resultant value for operand St to an entry in ROB 140 for each FMAC instruction. Once an instruction has completed executing, the resultant values for operands St and Sd are written back to register file 110 and the entry is deleted, thus removing or "retiring" the entry from ROB 140. However, ROB 140 controls the retirement of entries so that the values for operands St and Sd are written back to register file 110 in the original order of the issued instructions.

In the example shown in FIG. 1, the top of ROB 140 is the beginning of the buffer, and the bottom of ROB 140 is the end. Thus, instructions travel downward from top to bottom of ROB 140, and the oldest instructions are at the bottom.

Two example instruction entries are shown moving through ROB 140. The first instruction entry is illustrated as the top two dotted blocks in ROB 140. Multiplier 120 writes to the first instruction entry, which is labeled "M=1". The first instruction entry moves through ROB 140, and is later labeled "I=1". In one implementation, the "M" and "I" flags are used to track the status of the instruction entry, and will be described below in more detail. The second instruction entry is illustrated as the bottom two dotted blocks in ROB 140. Adder 130 writes to this instruction entry, which is labeled "D=1". Then, at the bottom of ROB 140, the instruction entry's pointer "P" is sent to selector 150 to select data from ROB 140. This process will also be described more fully below.

While ROB 140 is implemented as a FIFO buffer in FIG. 1, other buffer types are possible.

Selector 150 selects one of several sources and outputs that source into a single channel. In the implementation shown in FIG. 1, selector 150 selects operand St from one of the multiple entries in ROB 140, and outputs the operand St to adder 130. Selector 150 can be implemented as a multiplexer or by any other suitable configuration.

Hazard checking block 160 detects whether a currently executing instruction depends on data from a previous instruction. More specifically, during execution of pipelined instructions, it cannot be assumed that each instruction has executed before the next instruction begins. Thus, the data required for a current instruction might not yet be settled from previous instructions. This can lead to errors, as the data may not have reached a value the data should be at by the time the current instruction executes. Therefore, hazard checking block 160 determines whether a hazard exists. Based on whether hazard checking block 160 detects a hazard with a current instruction, the path by which adder 130 receives operand Sd may be altered so as to avoid using incorrect or corrupt data.

A process of computing a floating point multiply-accumulate (FMAC) instruction will now be briefly described with respect to FIG. 1. As discussed above, an FMAC operation is comprised of a multiply of operands S1 and S2 to yield operand St, followed by an addition of operands St and Sd (which is a result of a prior accumulation) to yield a new operand Sd.

The process begins when an FMAC instruction is dispatched. In response to the instruction, the operands S1 and S2 are fetched from register file 110 and transmitted to multiplier 120.

Multiplier 120 then multiplies operands S1 and S2 together to produce a result—i.e., operand St. Once operand St is ready, operand St can be transmitted to adder 130 for the addition stage of the FMAC instruction. As mentioned above, operand St is actually available after the $4^{th}$ clock cycle for transmission to adder 130. Thus, as shown in FIG. 1, multiplier 120 is configured so as to transmit operand St directly to adder 130 after the $4^{th}$ clock cycle, on pathway "a". Multiplier 120 can also transmit operand St to adder 130 after the $5^{th}$ clock cycle, on pathway "b". The third possible pathway for operand St to reach adder 130 is via pathway "c" from ROB 140, as discussed more fully below.

On the other hand, there are four possible pathways for operand Sd to reach adder 130. As mentioned above, the operand Sd from adder 130 is actually available after the $4^{th}$ clock cycle. Moreover, during multiple matrix multiply and accumulate operations, it is likely that the value for operand Sd will come from the previous operation by adder 130. Thus, as shown in FIG. 1, adder 130 can transmit the result operand Sd directly back to itself as an input, on pathway "1". Alternatively, adder 130 can transmit operand Sd to itself after the $5^{th}$ clock cycle, via pathway "2". The third possible pathway is pathway "3" from ROB 140, as discussed more fully below. Finally, under certain conditions, a pathway "4" can transmit operand Sd directly to adder 130 from the register file 110.

Thus, the operand St can be obtained at adder 130 via paths "a", "b" or "c", and the operand Sd can be obtained at adder 130 via paths "1", "2", "3" or "4". Of course, during each instruction execution, only one path is used for obtaining operand St, and only one path is used for obtaining operand Sd. The priority of the respective pathways will now be described. Then, certain pathways will be described in further detail. For purposes of simplicity, the combinations of pathways for operands St and Sd will use the notation x/y, wherein x is the pathway for operand St and y is the pathway for operand Sd. Thus, for example, the combination of the pathway "b" for operand St and the pathway "3" for operand Sd would be denoted as b/3.

Initially, under certain situations, the system may perform a "hold" operation (described in more detail below), in which one-stage buffers (not shown) hold the values of operands St and Sd, respectively, for one clock cycle while the Sd pipeline to hazard checking block 160 is stalled for the one cycle.

The highest priority is assigned to the combination of pathways "a" and "4" (or a/4). The combination a/4 is the highest priority because there is only one chance (i.e., one clock cycle) to obtain current values via these pathways. In particular, in a pipelined environment, multiplier 120 ordinarily does not wait for a single multiplication to process completely before starting the next multiplication. Rather, multiplier 120 continuously loads operands into the pipeline from subsequent FMAC instructions. Accordingly, unless operand St is taken from pathway "a" at the earliest possible point (the $4^{th}$ clock cycle), a different value will occupy this stage of multiplier 120 at the next clock cycle. Along the same lines, there is only one chance for each instruction to obtain the correct value for operand Sd from register file 110. In particular, since the values of operand Sd in register file 110 are constantly being rewritten and changed, the only way to ensure that the obtained value for operand Sd is correct is to obtain operand Sd before operand Sd can be rewritten in the next clock cycle. Thus, this pathway is given high priority. Additionally, since in pathway "4" the value for operand Sd is transmitted directly from register file 110, the combination a/4 produces relatively fast results.

After the combination a/4, the next highest priority is any one of the paths a/3, b/3 or c/3. In other words, the next highest priority is the combination of path "3" and whatever path of "a", "b" or "c" is available. This is because once the value for operand Sd is obtained from an entry in ROB 140 via path "3", that entry can be retired, and the value for operand Sd is written to register file 110. Thus, path "3" allows the system to clear entries out of ROB 140.

Next in priority are the paths b/2, b/1, a/2 or a/1. These paths are used in the special situations when pathway "3" is prohibited, as described below. Thus, these paths provide safe alternatives in the case that the data in ROB 140 cannot be trusted. As can be seen from FIG. 1, these paths obtain operand Sd directly from adder 130 and operand St directly from multiplier 120. In one implementation, path "2" has a higher priority than path "1", and path "b" has a higher priority than path "a". This is because if path "1" and/or "a" is missed, the operand still has a chance to be issued later via the "2" and/or "b" paths. On the other hand, if a "2" and/or "b" path is missed, the operand is issued in the "3" and/or "c" pipeline, which can be one-to-many clock cycles later. In addition, even though "1" and/or "a" is a faster path for the instruction, a current instruction can not retire before any previous instruction in a "2" and/or "b" path gets resolved and retired.

Accordingly, the operand St arrives at adder 130 via paths "a", "b" or "c" and the operand Sd arrives at adder 130 via paths "1", "2", "3" or "4", according to the above priority scheme.

In one implementation, pathways "4", "3" and "c" depend on values stored in ROB 140, and thus are more complex than simply forwarding a value. Moreover, these pathways generally have a higher priority than the pathways "a", "b", "1" and "2". Therefore, each of the pathways "4", "3" and "c" will be now described in further detail. Pathway "4" allows adder 130 to obtain a value for operand Sd quickly and directly from register file 110. However, the value for operand Sd can only be obtained via pathway "4" if the current FMAC instruction does not depend on the result of any other FMAC instruction. Specifically, if there is any dependency on another instruction in ROB 140, the system cannot use the value in register file 110, since the other instruction has not yet retired and written its data to register file 110. Accordingly, in order to use pathway "4" to obtain the value for operand Sd, the system must determine whether the FMAC instruction depends on another instruction using hazard checking block 160 and ROB 140.

As mentioned above, each instruction is assigned an entry in ROB 140 upon dispatch. Each instruction entry includes an identifier tag which is an identifier for the current entry. The entry tags are assigned sequentially (i.e., 0, 1, 2, . . . ), and loop back to 0 once the maximum number of entries is reached. Each instruction's entry also stores operands St and Sd for the instruction, temporarily storing these values before writing operands St and Sd back to register file 110. Thus, as an FMAC instruction executes, multiplier 120 outputs a value for operand St to ROB 140, and adder 130 outputs a value for operand Sd to ROB 140, as shown in FIG. 1. As an additional matter, each Sd entry includes an Sd tag indicating the corresponding operand Sd in register file 110, i.e., the operand Sd which the Sd entry writes to.

Several flags are used to track the status of each entry in ROB 140. In particular, each entry includes a flag "D" indicating whether another instruction depends on the entry. Each entry also includes a pointer "P". If there is another instruction dependent on the entry (D=1), the entry's pointer "P" points to the logical distance in ROB 140 between the dependent instruction's entry and the subject entry. Additionally, each entry includes an "M" flag indicating whether the multiplication for the instruction has been completed, and an "I" flag indicating whether the instruction has been fully executed, i.e., whether both the multiplication and addition are complete.

The function of hazard checking block 160 will now be described.

During the $3^{rd}$ clock cycle of each FMAC instruction, the instruction's Sd tag is sent to register file 110, as well as to hazard checking block 160. Based on the Sd tag for the current instruction, hazard checking block 160 determines if the current instruction depends on values from another instruction. If so, a hazard exists, and pathway "4" is not used. On the other hand, if there is no potential hazard, the operand Sd can be transmitted directly from register file 110 to adder 130.

To check whether a data dependency exists for a current FMAC instruction, hazard checking block 160 determines whether any entries in ROB 140 include an Sd tag which matches that of the current instruction. If there is no match between the Sd tags, there is no data dependency, and the operand Sd can issue directly from register file 110 via pathway "4". On the other hand, if there are one or more matches, hazard checking block 160 stops at the first instruction entry which has a matching Sd tag. Hazard checking block 160 only identifies the closest entry, even if there are other matches.

Once the matching entry is identified, hazard checking block 160 sets the "D" flag of the matching entry to "1" to indicate that another instruction (i.e., the current instruction) depends on that entry. Furthermore, hazard checking block 160 sets the pointer "P" of the matching entry to the offset in ROB 140 between the matching entry and the current instruction's entry. Thus, the pointer P is set to the logical distance between the two entries with matching tags. In one implementation, the offset can simply be the logical difference between the identifier tags of the two entries (e.g., 7 spaces), since the identifier tags are sequentially assigned to each entry.

At the same time, hazard checking block 160 sends a signal "Dtag" to a CPU or other control unit (not shown) indicating that the current instruction depends on another instruction. Thus, the CPU or other control unit is informed of the potential hazard, and prohibits use of the pathway "4" for the current instruction. The dependent instruction also carries its tag in its execution pipeline. The "Dtag" is compared with the instruction tags ("ADDtag") at the last two stages of the adder pipeline. The detection of a match is used to validate the adder feedback pathways "1" or "2".

A brief example of programming language that can be used to implement hazard checking is provided below. Of course, numerous other methods of implementing this functionality in hardware and/or software and/or firmware are available to one of ordinary skill in the art, and the following example should therefore be viewed as representative only, and not limiting.

MACentry=tag==entry.tag
Vtop=0; Vnext=MACentry|(Vprev & (Sd !=entry.dest))
D=(Sd==entry.dest) & Vprev
entry.D|=D
Ptop=0; Pnext=MACentry ? 001: Ppre+1
entry.P|=D & Ppre
Sd.hazard=|(D [7:1]|(D[0] & ~retire)
Dtag=|(D&entry.tag) [7:0]

If pathway "4" is not available, pathways "c" and "3" may be used to obtain operands St and Sd from ROB 140. Pathways "c" and "3" provide the advantage of allowing instruction entries to be retired from ROB 140. In one implementation, once an instruction has reached the bottom of ROB 140, the instruction is ready to be "retired". That is, the instruction's values can be written back to register file 110, and the instruction entry can be deleted from ROB 140.

Before an instruction can be retired, however, the system must ensure that any dependent instruction obtains the retiring instruction's values. Thus, if the "D" flag is set in the about-to-be-retired instruction's entry in ROB 140, then another entry still depends on the about-to-be-retired instruction. In such a case, the value for operand Sd of the retiring entry is obtained directly from the retiring entry in ROB 140 and sent to adder 130 via the pathway "3", thus ensuring that the dependent instruction receives the latest value for operand Sd. On the other hand, since the value for operand St is not dependent on previous instructions (operand St depends only on the original S1 and S2 from register file 110), the dependent entry can simply use its "own" value for operand St. Thus, from the retiring entry, the pointer P is used as an input to selector 150 to select operand St from the entry which depends on the about-to-be-retired instruction. Then, the value for operand St of the dependent entry is sent from selector 150 to adder 130 via pathway "c".

Therefore, when an instruction from which another instruction depends retires, a value for operand Sd as determined by the retiring instruction is sent to adder 130 along with the dependent entry's own value for operand St. Accordingly, since the latest value for operand Sd is transmitted from ROB 140 to the adder, the value for operand Sd sent to adder 130 is the same as that written to register file 110 as the instruction retires, thus ensuring the latest value of operand Sd and clearing entries out of ROB 140.

Thus, as can be seen, pathways "4" and "3" both provide advantages over other pathways. Specifically, pathway "4" obtains a value for operand Sd directly from register file 110 to provide operands quickly. On the other hand, pathway "3" allows entries to be retired from ROB 140. However, pathway "4" cannot be used if there is a data dependency, as discussed above. Moreover, certain special cases necessitate that pathway "3" not be used, forcing the system to obtain the operand from lower-priority pathways.

One special case occurs if multiplier 120 has not yet written an instruction's value for operand St to ROB 140. In such a case, the value for operand St corresponding to that instruction in ROB 140 should not be used, since the value for operand St does not reflect the instructed multiplication.

To address this situation, the example embodiment provides each instruction entry with a flag "M". M=1 indicates that the multiplication for the instruction is complete. Conversely, M=0 indicates that the multiplication is not complete, i.e., the instruction's value for operand St has not yet been written to ROB 140. Thus, as shown in FIG. 1, an "M" is written to ROB 140 along with the value for operand St from multiplier 120. Accordingly, if it is determined by the CPU or control software that M=0 for an instruction entry, pathway "c" is prohibited, and the value for operand St must instead come from paths "a" or "b".

Another special situation arises when a value for operand Sd has already issued to adder 130 but the corresponding entry has not yet been retired from ROB 140. In such a case, path "3" should not be used, since the path "3" would write a value for operand Sd to adder 130 twice for a single instruction. Thus, in the example embodiment, each command entry in ROB 140 includes a flag "I". The flag "I" is written to the ROB entry if the instruction has already been fully executed. For example, if the multiplier 120 has already sent a value for operand St to the adder 130 via path "b" and the value for operand Sd has already been obtained at adder 130 via path "2", the instruction has already executed. Accordingly, in the example of FIG. 1, multiplier 120 writes an "I" to ROB 140 to indicate that the instruction has been executed. In addition, a signal "ADDtag" can be sent to the system to alert the system that the instruction has already issued, and therefore should not issue again via pathway "3". Accordingly, the system can prevent multiple issuances of the same instruction by prohibiting pathway "3".

Another special situation arises when path "4" repeatedly pre-empts instructions from issuing via the pathway "3". Specifically, both paths a/4 and c/3 may be ready to go into adder 130 at the same time. As mentioned above, path a/4 has the highest priority, and thus would take precedence to go into the adder. However, if path a/4 is repeatedly available over several cycles, i.e., several instructions in a row use path "4", a situation may arise that ROB 140 begins to fill up, since instructions are not being retired from ROB 140 via path "3".

One technique of addressing this situation often results in inferior performance, and is therefore not used in the example embodiment. According to this technique, the entries in ROB 140 are held purposely, so as to temporarily prevent entries from retiring. Since no new entries can be written to ROB 140, ROB 140 becomes full, and processing backs up because no new entries can be created in ROB 140. Thus, hazard checking block 160 stops checking dependencies for each instruction. Without a valid dependency check, pathway "4" is no longer an option, and pathway "3" eventually retires instructions from the buffer. Thus, this technique can lead to decreased performance.

Accordingly, in the example embodiment herein, one-stage buffers (not shown) are added on each of the "c" and "3" pathways. These one-stage buffers hold the values of operands St and Sd, respectively, for one clock cycle. At the same time, the Sd pipeline from multiplier 120 to hazard checking block 160 is stalled for the one cycle, thus prohibiting use of path "4". Thus, values for operands St and Sd can be obtained via paths "c" and "3" from ROB 140, and the corresponding instruction can be retired from ROB 140. Then during the next cycle, the value in the hold buffer can be sent to adder 130.

A brief example of programming logic to implement the above priority scheme is provided below. Again, numerous methods of implementing the above priority scheme in hardware and/or software and/or firmware are available to one of ordinarily skill in the art.

a4: ~Sd_hazard
c3: D & (P->M) & ~(P->I);
b1, b2, b3: Dtag@b==ADDtag @ 1, 2, 3
a1,a2,a3: Dtag@a==ADDtag @ 1, 2, 3

FIG. 2 graphically depicts the relationships between different pathways. In each column, a circle (o) or square (□) around the path indicates that the combination of pathways can be used. Thus, for example, in the top segment, if the pathway for operand Sd is "1", then the pathway for operand St can be either "b" or "a". As described above, Sd pathway "4" can only be used with St pathway "a", and St pathway "c" can only be used with Sd pathway "3" (although Sd pathway "3" is not limited to pathway "c"). The square (□) represents a valid feedback path combination that can be missed, and thus a lower priority, whereas the circle (o) represents the last chance to issue the St and Sd to the adder, and thus higher a priority.

While example aspects have been described above with respect to an FMAC instruction, other instructions could be used. For example, the present disclosure could also be applied to FNMAC, FMSC, or FNMSC instructions, among others. In addition, as described above, ROB 140 is used to store not only the final result of an instruction, but also the intermediate result of an instruction, and this intermediate result is retrieved by a distance pointer which is fixed while dependency moves down the ROB. This could be applied to more generic applications other than FMAC-type instructions. In addition, the present disclosure could be applied to 64-bit double precision instructions. In such a case, for example, the one-stage buffers could be used to hold one 32-bit half of an operand while the other 32-bit half is fetched from the register file.

Thus, by virtue of the above example arrangements, data dependencies in FMAC instructions can be accounted for without requiring large and/or expensive extra hardware.

Figure 3A:
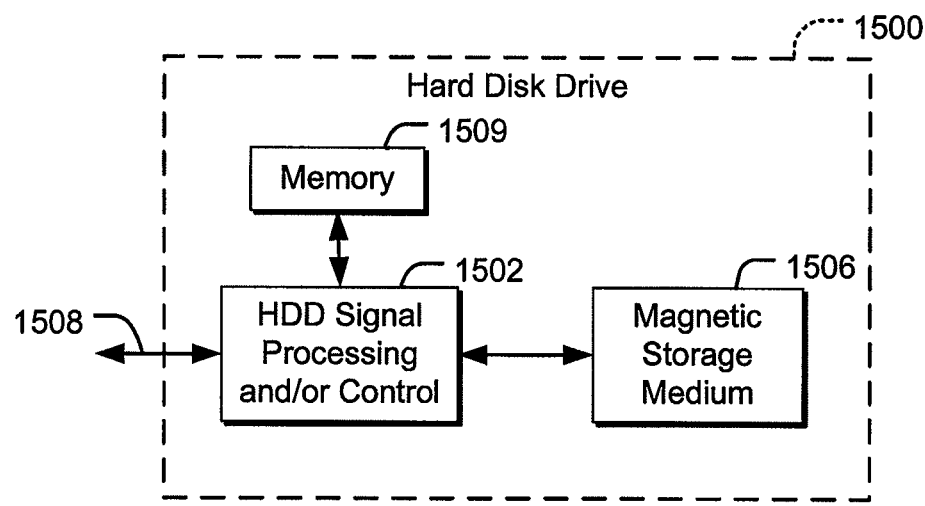
FIG. 3A is a block diagram showing an example embodiment of the invention in a hard disk drive (HDD).

Referring now to FIGS. 3A-3H, various exemplary implementations of the present invention are shown. Referring to FIG. 3A, the present invention may be embodied for processing instructions in a hard disk drive (HDD) 1500. The present invention may implement either or both signal processing and/or control circuits, which are generally identified in FIG. 3A at 1502. In some implementations, signal processing and/or control circuit 1502 and/or other circuits (not shown) in HDD 1500 may process data, perform coding and/or encryption, perform calculations, and/or format data that is output to and/or received from a magnetic storage medium 1506.

HDD 1500 may communicate with a host device (not shown) such as a computer, mobile computing devices such as personal digital assistants, cellular phones, media or MP3 players and the like, and/or other devices via one or more wired or wireless communication links 1508. HDD 1500 may be connected to memory 1509, such as random access memory (RAM), a low latency nonvolatile memory such as flash memory, read only memory (ROM) and/or other suitable electronic data storage.

Figure 3B:
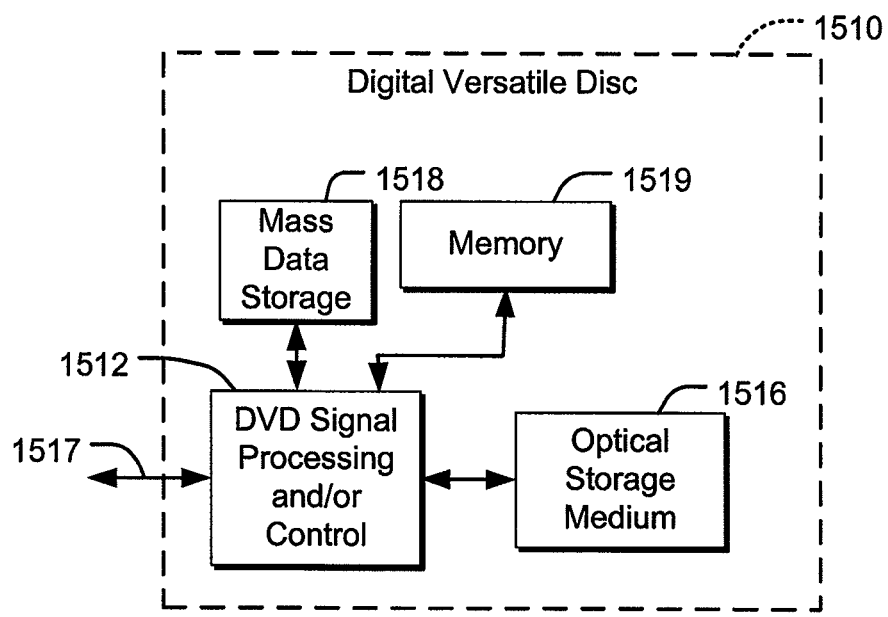
FIG. 3B is a block diagram of an example embodiment of the invention in a digital versatile disc (DVD) drive.

Referring now to FIG. 3B, the present invention may be embodied for processing instructions in a digital versatile disc (DVD) drive 1510. The present invention may implement either or both signal processing and/or control circuits, which are generally identified in FIG. 3B at 1512, and/or mass data storage 1518 of DVD drive 1510. Signal processing and/or control circuit 1512 and/or other circuits (not shown) in DVD drive 1510 may process data, perform coding and/or encryption, perform calculations, and/or format data that is read from and/or data written to an optical storage medium 1516. In some implementations, signal processing and/or control circuit 1512 and/or other circuits (not shown) in DVD drive 1510 can also perform other functions such as encoding and/or decoding and/or any other signal processing functions associated with a DVD drive.

DVD drive 1510 may communicate with an output device (not shown) such as a computer, television or other device via one or more wired or wireless communication links 1517. DVD drive 1510 may communicate with mass data storage

1518 that stores data in a nonvolatile manner. Mass data storage 1518 may include a hard disk drive (HDD) such as that shown in FIG. 3A. The HDD may be a mini HDD that includes one or more platters having a diameter that is smaller than approximately 1.8". DVD drive 1510 may be connected to memory 1519, such as RAM, ROM, low latency nonvolatile memory such as flash memory, and/or other suitable electronic data storage.

Figure 3C:
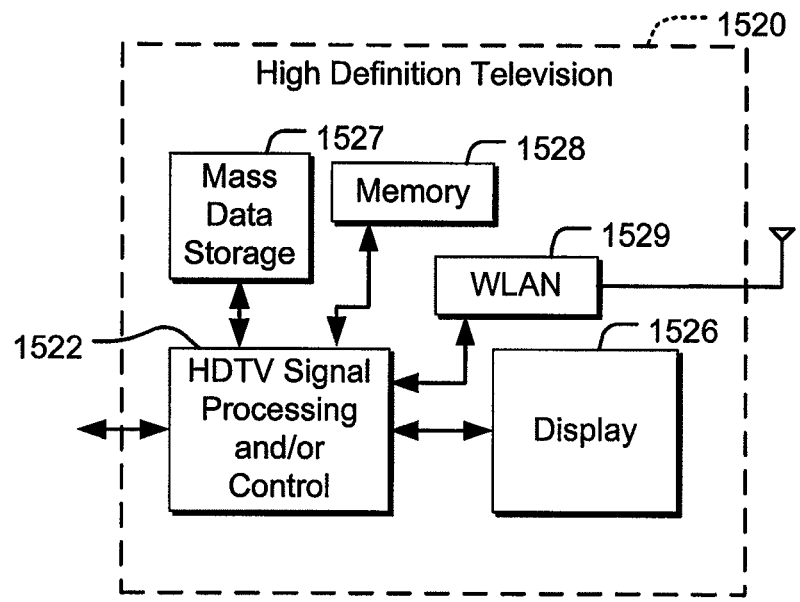
FIG. 3C is a block diagram of an example embodiment of the invention in a high definition television (HDTV).

Referring now to FIG. 3C, the present invention may be embodied for processing instructions in a high definition television (HDTV) 1520. The present invention may implement either or both signal processing and/or control circuits, which are generally identified in FIG. 3C at 1522, a WLAN network interface 1529 and/or mass data storage 1527 of the HDTV 1520. HDTV 1520 receives HDTV input signals in either a wired or wireless format and generates HDTV output signals for a display 1526. In some implementations, signal processing circuit and/or control circuit 1522 and/or other circuits (not shown) of HDTV 1520 may process data, perform coding and/or encryption, perform calculations, format data and/or perform any other type of HDTV processing that may be required.

HDTV 1520 may communicate with mass data storage 1527 that stores data in a nonvolatile manner such as optical and/or magnetic storage devices, for example, hard disk drives (HDDs) and/or DVD drives. At least one HDD may have the configuration shown in FIG. 3A and/or at least one DVD drive may have the configuration shown in FIG. 3B. The HDD may be a mini HDD that includes one or more platters having a diameter that is smaller than approximately 1.8". HDTV 1520 may be connected to memory 1528 such as RAM, ROM, low latency nonvolatile memory such as flash memory and/or other suitable electronic data storage. HDTV 1520 also may support connections with a WLAN via WLAN network interface 1529.

Figure 3D:
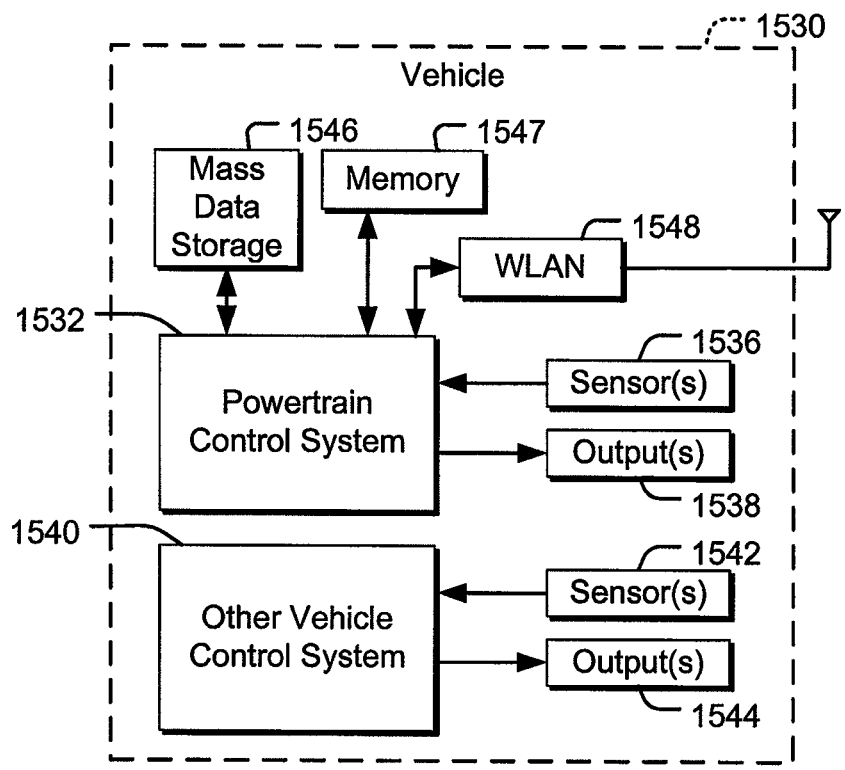
FIG. 3D is a block diagram of an example embodiment of the invention in a vehicle.

Referring now to FIG. 3D, the present invention may be embodied for processing instructions in a control system of a vehicle 1530, a WLAN network interface 1548 and/or mass data storage 1546 of the vehicle 1530. In some implementations, the present invention implements a powertrain control system 1532 that receives inputs from one or more sensors 1536 such as temperature sensors, pressure sensors, rotational sensors, airflow sensors and/or any other suitable sensors and/or that generates one or more output control signals 1538 such as engine operating parameters, transmission operating parameters, braking parameters, and/or other control signals.

The present invention may also be embodied in other control systems 1540 of vehicle 1530. Control system 1540 may likewise receive signals from input sensors 1542 and/or output control signals to one or more output devices 1544. In some implementations, control system 1540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1532 may communicate with mass data storage 1546 that stores data in a nonvolatile manner. Mass data storage 1546 may include optical and/or magnetic storage devices for example hard disk drives (HDDs) and/or DVD drives. At least one HDD may have the configuration shown in FIG. 3A and/or at least one DVD drive may have the configuration shown in FIG. 3B. The HDD may be a mini HDD that includes one or more platters having a diameter that is smaller than approximately 1.8". Powertrain control system 1532 may be connected to memory 1547 such as RAM, ROM, low latency nonvolatile memory such as flash memory and/or other suitable electronic data storage. Powertrain control system 1532 also may support connections with a WLAN via WLAN network interface 1548. The control system 1540 may also include mass data storage, memory and/or a WLAN network interface (all not shown).

Figure 3E:
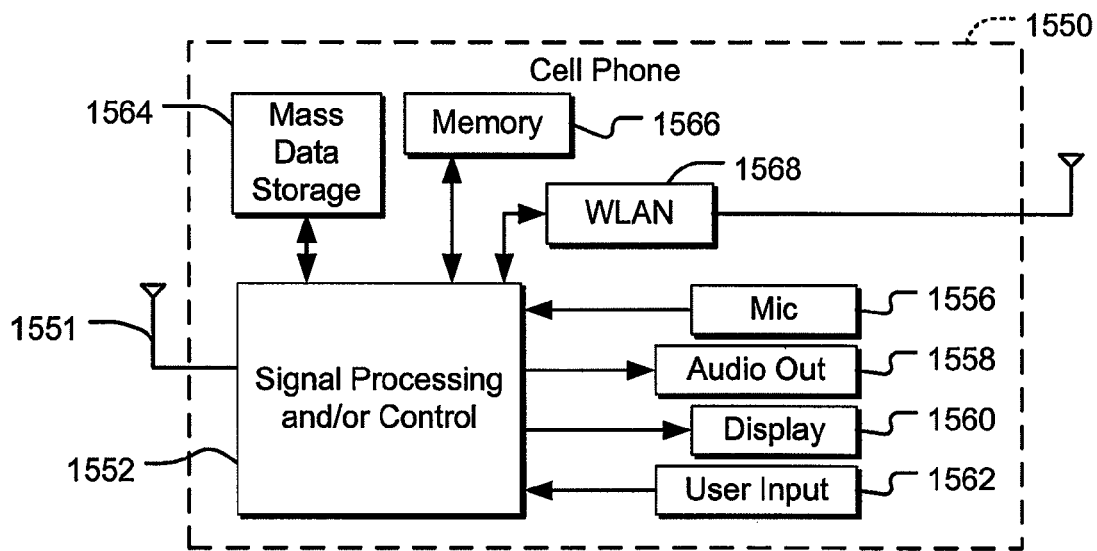
FIG. 3E is a block diagram of an example embodiment of the invention in a cellular or mobile phone.

Referring now to FIG. 3E, the present invention may be embodied for processing instructions in a cellular phone 1550 that may include a cellular antenna 1551. The present invention may implement either or both signal processing and/or control circuits, which are generally identified in FIG. 3E at 1552, a WLAN network interface 1568 and/or mass data storage 1564 of the cellular phone 1550. In some implementations, cellular phone 1550 includes a microphone 1556, an audio output 1558 such as a speaker and/or audio output jack, a display 1560 and/or an input device 1562 such as a keypad, pointing device, voice actuation and/or other input device. Signal processing and/or control circuits 1552 and/or other circuits (not shown) in cellular phone 1550 may process data, perform coding and/or encryption, perform calculations, format data and/or perform other cellular phone functions.

Cellular phone 1550 may communicate with mass data storage 1564 that stores data in a nonvolatile manner such as optical and/or magnetic storage devices, for example, hard disk drives (HDDs) and/or DVD drives. At least one HDD may have the configuration shown in FIG. 3A and/or at least one DVD drive may have the configuration shown in FIG. 3B. The HDD may be a mini HDD that includes one or more platters having a diameter that is smaller than approximately 1.8". Cellular phone 1550 may be connected to memory 1566 such as RAM, ROM, low latency nonvolatile memory such as flash memory and/or other suitable electronic data storage. Cellular phone 1550 also may support connections with a WLAN via WLAN network interface 1568.

Figure 3F:
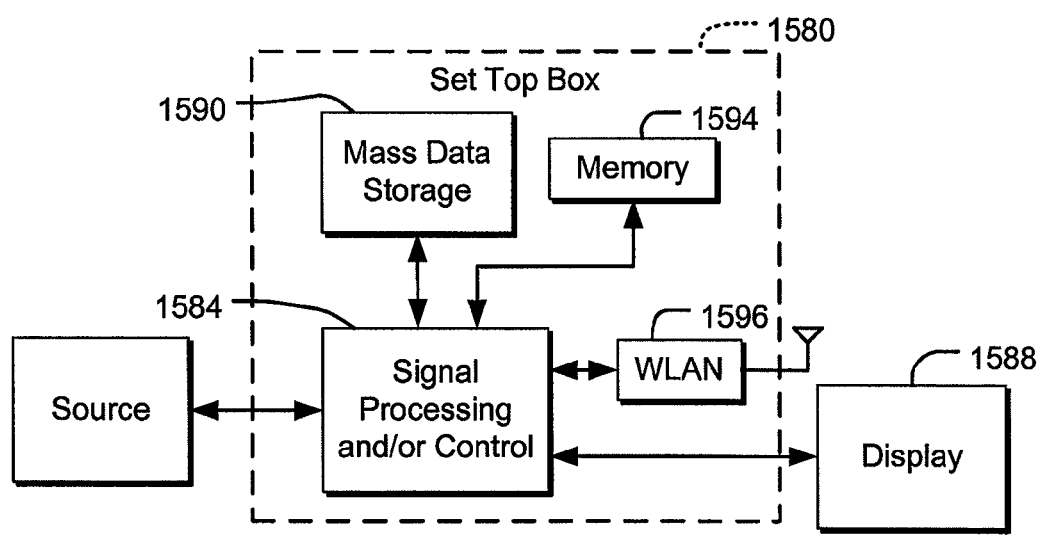
FIG. 3F is a block diagram of an example embodiment of the invention in a set-top box.

Referring now to FIG. 3F, the present invention may be embodied for processing instructions in a set top box 1580. The present invention may implement either or both signal processing and/or control circuits, which are generally identified in FIG. 3F at 1584, a WLAN network interface 1596 and/or mass data storage 1590 of the set top box 1580. Set top box 1580 receives signals from a source such as a broadband source and outputs standard and/or high definition audio/video signals suitable for a display 1588 such as a television and/or monitor and/or other video and/or audio output devices. Signal processing and/or control circuits 1584 and/or other circuits (not shown) of the set top box 1580 may process data, perform coding and/or encryption, perform calculations, format data and/or perform any other set top box function.

Set top box 1580 may communicate with mass data storage 1590 that stores data in a nonvolatile manner. Mass data storage 1590 may include optical and/or magnetic storage devices, for example, hard disk drives (HDDs) and/or DVD drives. At least one HDD may have the configuration shown in FIG. 3A and/or at least one DVD drive may have the configuration shown in FIG. 3B. The HDD may be a mini HDD that includes one or more platters having a diameter that is smaller than approximately 1.8". Set top box 1580 may be connected to memory 1594 such as RAM, ROM, low latency nonvolatile memory such as flash memory and/or other suitable electronic data storage. Set top box 1580 also may support connections with a WLAN via WLAN network interface 1596.

Figure 3G:
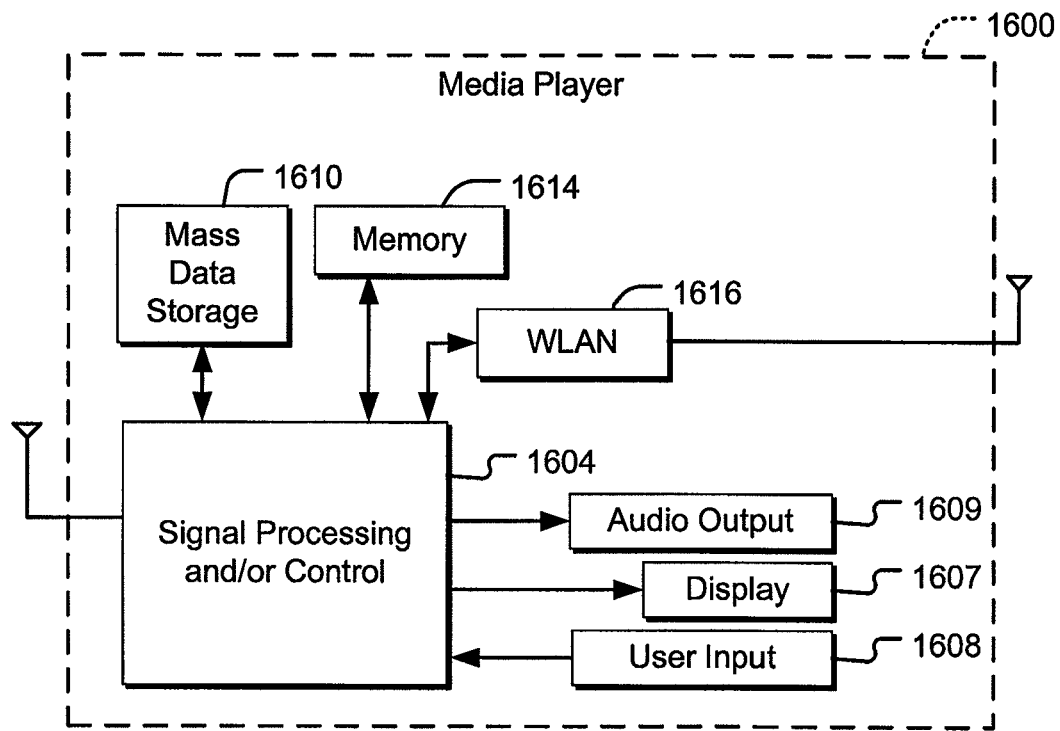
FIG. 3G is a block diagram of an example embodiment of the invention in a media player.

Referring now to FIG. 3G, the present invention may be embodied for processing instructions in a media player 1600. The present invention may implement either or both signal processing and/or control circuits, which are generally identified in FIG. 3G at 1604, a WLAN network interface 1616 and/or mass data storage 1610 of the media player 1600. In some implementations, media player 1600 includes a display 1607 and/or a user input 1608 such as a keypad, touchpad and the like. In some implementations, media player 1600 may employ a graphical user interface (GUI) that typically employs menus, drop down menus, icons and/or a point-and-click interface via display 1607 and/or user input 1608. Media player 1600 further includes an audio output 1609 such as a speaker and/or audio output jack. Signal processing and/or control circuits 1604 and/or other circuits (not shown) of media player 1600 may process data, perform coding and/or encryption, perform calculations, format data and/or perform any other media player function.

Media player 1600 may communicate with mass data storage 1610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices, for example, hard disk drives (HDDs) and/or DVD drives. At least one HDD may have the configuration shown in FIG. 3A and/or at least one DVD drive may have the configuration shown in FIG. 3B. The HDD may be a mini HDD that includes one or more platters having a diameter that is smaller than approximately 1.8". Media player 1600 may be connected to memory 1614 such as RAM, ROM, low latency nonvolatile memory such as flash memory and/or other suitable electronic data storage. Media player 1600 also may support connections with a WLAN via WLAN network interface 1616. Still other implementations in addition to those described above are contemplated.

Figure 3H:
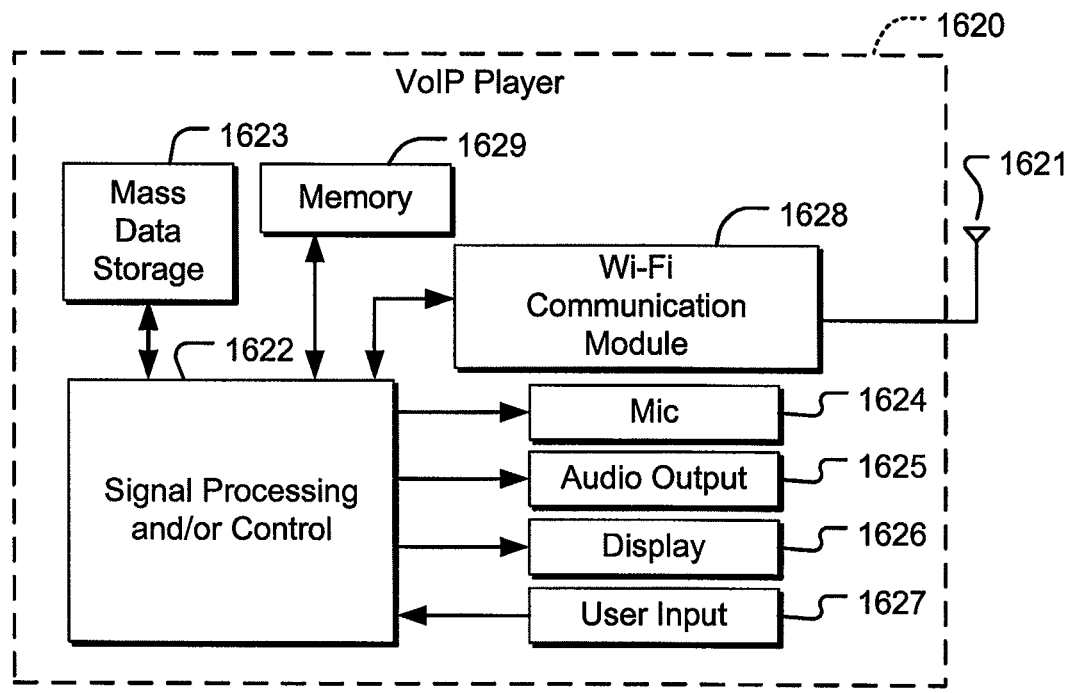
FIG. 3H is a block diagram of an example embodiment of the invention in a Voice-over Internet Protocol (VoIP) player.

Referring to FIG. 3H, the present invention may be embodied for processing instructions in a Voice over Internet Protocol (VoIP) player 1620 that may include an antenna 1621. The present invention may implement either or both signal processing and/or control circuits, which are generally identified in FIG. 3H at 1622, a wireless interface and/or mass data storage 1623 of the VoIP player 1620. In some implementations, VoIP player 1620 includes, in part, a microphone 1624, an audio output 1625 such as a speaker and/or audio output jack, a display monitor 1626, an input device 1627 such as a keypad, pointing device, voice actuation and/or other input devices, and a Wireless Fidelity (Wi-Fi) communication module 1628. Signal processing and/or control circuits 1622 and/or other circuits (not shown) in VoIP player 1620 may process data, perform coding and/or encryption, perform calculations, format data and/or perform other VoIP player functions.

VoIP player 1620 may communicate with mass data storage 1623 that stores data in a nonvolatile manner such as optical and/or magnetic storage devices, for example hard disk drives (HDDs) and/or DVD drives. At least one HDD may have the configuration shown in FIG. 3A and/or at least one DVD drive may have the configuration shown in FIG. 3B. The HDD may be a mini HDD that includes one or more platters having a diameter that is smaller than approximately 1.8". VoIP player 1620 may be connected to memory 1629, which may be a RAM, ROM, low latency nonvolatile memory such as flash memory and/or other suitable electronic data storage. VoIP player 1620 is configured to establish communications link with a VoIP network (not shown) via Wi-Fi communication module 1628.

Example aspects of the present disclosure have been described above with respect to particular illustrative example embodiments. However, the disclosure is not limited to the above-described example embodiments and various changes and modifications may be made without departing from the scope of the disclosure and the following claims.

Computer Program Listing

The following is the implementation RTL in Verilog HDL.:
The following module contains the prioritization scheme for selecting various pathways to the adder (Note: pathway "1" is not implemented.):

```
module fpu_addsub_issue (
//outputs
    output          [`VFP_TAG_WIDTH-1:0]    addsub_tag_o,
    output                                  addsub_h_valid_o,
    output                                  addsub_l_valid_o,
    output          [31:0]                  addsub_fop1h_o,
    output          [31:0]                  addsub_fop1l_o,
    output          [31:0]                  addsub_fop2h_o,
    output          [31:0]                  addsub_fop2l_o,
    output                                  addsub_add_o,
    output                                  addsub_sub_o,
    output                                  addsub_msc_o,
    output          [3:0]                   addsub_double_o,
    output          [1:0]                   addsub_rmodes_o,
    output          [`VEXCEPTION_WIDTH-1:0] addsub_chainexcept_o,
//to issue
    output                                  issue_chain_issue_o,
//to mul
    output                                  mul_chain_issued_fe4_o,
    output                                  mul_chain_issued_fe5_o,
    output                                  mul_chain_stall_fe3_o,
//to reg file
    output                                  vrf_rd_single2_o,
    output          [4:0]                   vrf_rd_index2_o,
    output                                  vrf_chain_load_o,
//to vrob
//output
                                            vrob_chain_retire_hold_o,
    output                                  vrob_chain_hazard_issue_o,  //not used anymore
    output                                  vrob_addsub_chain_issue_o,  //path 2 issue
//inputs
    input                                   issue_a_vis_i,
    input           [`FD_WIDTH-1:0]         issue_a_cntl_i,
```

```
    input              [`VFP_TAG_WIDTH-1:0]    issue_a_tag_i,
    input              [1:0]            vrf_rmodes_i, //vrf_fpscr[ FPSCR_RMODE]
    input              [63:0]           vrf_rd_value0_i,
    input              [63:0]           vrf_rd_value1_i,
    input              [63:0]           vrf_rd_value2_i, //path 4
//input from outside of issue
    //from vrob
    input              [63:0]           vrob_src1_bypass_result_i,
    input              [63:0]           vrob_src2_bypass_result_i,
    input                               vrob_src1_bypass_valid_i,
    input                               vrob_src2_bypass_valid_i,
    input                               vrob_chain_hazard_i, //fe3: dest(at least
partial) is in rob
    input              [`VROB_RESULT_WIDTH-1:0]   vrob_chain_result_i    //path c
    input                               vrob_chain_double_i,
    input                               vrob_chain_negate_i,
    input                               vrob_chain_valid_i,    //P->M
    input                               vrob_chain_issued_i,   //P->I
    input                               vrob_chain_odd_dest_i,
    input              [`VFP_TAG_WIDTH-1:0]    vrob_chain_tag_i,
    //raw entry0 stuff
    input              [`VFP_TAG_WIDTH-1:0]    vrob_entry0_tag_i,
    input                               vrob_entry0_hazard_i, //D bit
    input              [`VROB_RESULT_WIDTH-1:0]   vrob_entry0_result_i, //
vrob_src3_bypass_result_i,   //path 3
    input              [`VROB_CNTL_WIDTH-1:0]   vrob_entry0_cntl_i,
    input           vrob_retire_rdy_i,
    //from mul
    input              [`VFP_TAG_WIDTH-1:0]     mul_tag_i,
    input                               mul_double_i,
    input                               mul_negate_i,
    input                               mul_chain_valid_i,     //mul_result_valid &
chain_instruction
    input              [`VROB_RESULT_WIDTH-1:0]   mul_result_i,    //path b
    input              [`VFP_TAG_WIDTH-1:0]     mul_tag_fe4_i,
    input                               mul_double_fe4_i,
    input                               mul_negate_fe4_i,
    input                               mul_chain_valid_fe4_i,    //fe4:
    input              [`VROB_RESULT_WIDTH-1:0]   mul_result_fe4_i,    //path a
    input              [`VFP_TAG_WIDTH-1:0]   mul_chain_hazardtag_i,
    input              [`VFP_TAG_WIDTH-1:0]   mul_chain_hazardtag_fe4_i,
    input                               mul_double_fe3_i,
    input                               mul_chain_fe3_i,
    input              [4:0]            mul_sd_index_fe3_i,
    //from addsub
    input                               addsub_load_ve_i ,
    input              [`VFP_TAG_WIDTH-1:0]     addsub_result_tag_i,    //path 2
    input                               addsub_result_double_i,
    input                               addsub_result_valid_i,
    input              [63:0]          addsub_result_i,    //path 2
    input                               pclk,
    input                               preset_l
);
    // //              synopsys dc_tcl_script_begin
    // //              set_flatten true -effort medium -minimize multiple_output -
phase true
    // //              synopsys dc_tcl_script_end
    wire vrob_entry0_double = vrob_entry0_cntl_i[`VROB_DP];
    wire chain_issued_fe5;
    DFF_X #(1) chain_issued_fe5_ff (chain_issued_fe5,
mul_chain_issued_fe4_o, pclk, preset_l); //assume nothing stalls mul
fe4-5
//////////////////////////////////////////////////////////////
////////////////////////
    // when the data dependency in the ROB is ready to issue, the chain
instruction is always somewhere in a, b, or c
    // retirement is not blocked, but stored temporarily, and must be
issued the next cycle, stall mul fe3 if necessary
    // DP depend on SP can not issue immediately. must hold and read
from reg file again
    wire chain_hazard_issue_rdy = vrob_retire_rdy_i &
vrob_entry0_hazard_i & ~vrob_chain_issued_i;
    wire chain_dpsp = chain_hazard_issue_rdy & vrob_chain_double_i &
~vrob_entry0_double;
    wire chain_spdp_h21 = ~vrob_chain_double_i & vrob_entry0_double &
vrob_chain_odd_dest_i;
    wire chain_dpsp_l2h = ~vrob_entry0_double & vrob_chain_double_i &
vrob_entry0_cntl_i[8];
    wire [31:00] vrob_entry0_result_h = chain_dpsp_l2h ?
```

```
       vrob_entry0_result_i[31:00] : vrob_entry0_result_i[63:32];
    wire [31:00] vrob_entry0_result_l = chain_spdp_h2l ?
       vrob_entry0_result_i[63:32] : vrob_entry0_result_i[31:00];
         wire chain_dpsp_4h = chain_dpsp & ~vrob_entry0_cntl_i[8];
         wire chain_dpsp_4l = chain_dpsp & vrob_entry0_cntl_i[8];
         wire chain_dpsp_4h_hold;
         wire chain_dpsp_4l_hold;
         DFF_X #(1) chain_dpsp_4h_hold_ff(chain_dpsp_4h_hold, chain_dpsp_4h,
pclk, preset_l) ;
         DFF_X #(1) chain_dpsp_4l_hold_ff(chain_dpsp_4l_hold, chain_dpsp_4l,
pclk, preset_l) ;
         wire chain_path_hold_in = chain_hazard_issue_rdy &
~vrob_chain_hazard_issue_o; // | chain_dpsp; chain_dpsp implies
~vrob_chain_hazard_issue_o
         wire chain_path_hold;
         DFF_X #(1) chain_path_hold_ff (chain_path_hold, chain_path_hold_in,
pclk, preset_l) ;
         // stall mul fe3 when: retire ready to issue but not issued and the
next fe3 is chain (ready for reg read and hazard check)
         // this includes the case of DPSP reread.
         assign mul_chain_stall_fe3_o = chain_hazard_issue_rdy &
~vrob_chain_hazard_issue_o & mul_chain_fe3_i ; // &
(~vrob_chain_hazard_i | dpsp) ??
    wire mul_chain_stall_fe4;
    DFF_X #(1) mul_chain_stall_fe4_ff (mul_chain_stall_fe4,
mul_chain_stall_fe3_o, pclk, preset_l);
    assign vrf_rd_single2_o = chain_dpsp? 1`b0 : ~mul_double_fe3_i;
    assign vrf_rd_index2_o = chain_dpsp? vrob_entry0_cntl_[ VROB_INDEX0]
& 5'b11110 : mul_sd_index_fe3_i;
    assign vrf_chain_load_o = mul_chain_fe3_i | chain_dpsp;
    wire chain_hazard_fe4, chain_hazard_fe5;
    DFF_X #(1) chain_hazard_fe4_ff (chain_hazard_fe4, vrob_chain_hazard_i
, pclk, preset_1); //assume nothing stalls mul fe4-5
    DFF_X #(1) chain_hazard_fe5_ff (chain_hazard_fe5, chain_hazard_fe4 ,
pclk, preset_1); //assume nothing stalls mul fe4-5
/////////////////////////////////////////////////////////////////////
/////////////////////////////
     // check forwarding combination available
     wire chain_path_a4 = mul_chain_valid_fe4_i & -chain_hazard_fe4; //&
~mul_chain_stall_fe4; //align vrob_chain_hazard_i with mul_fe4
     wire chain_path_c3 = chain_hazard_issue_rdy & vrob_chain_valid_i &
(~vrob_chain_double_i | vrob_entry0_double);
     wire chain_path_b3 = mul_chain_valid_i & vrob_retire_rdy_i &
vrob_entry0_hazard_i & ~chain_issued_fe5 & chain_hazard_fe5 &
(mul_chain_hazardtag_i == vrob_entry0_tag_i) & (~mul_double_i |
vrob_entry0_double) ;
     wire chain_path_a3 = mul_chain_valid_fe4_i & vrob_retire_rdy_i &
vrob_entry0_hazard_i & chain_hazard_fe4 & (mul_chain_hazardtag_fe4_i ==
vrob_entry0_tag_i) & (~mul_double_fe4_i | vrob_entry0_double);
     wire chain_path_b2 = mul_chain_valid_i & addsub_result_valid_i &
chain_hazard_fe5 & (mul_chain_hazardtag_i == addsub_result_tag_i) &
(mul_double_i ~^ addsub_result_double_i) & ~chain_issued_fe5;
     wire chain_path_a2 = mul_chain_valid_fe4_i & addsub_result_valid_i &
chain_hazard_fe4 & (mul_chain_hazardtag_fe4_i == addsub_result_tag_i) &
(mul_double_fe4_i ~^ addsub_result_double_i);
/////////////////////////////////////////////////////////////////////
/////////////////////////////
     `ifdef SVA
       // synopsys translate_off
       assert_never chain_path_c3_tag_match(pclk,preset_l,
vrob_entry0_hazard_i&(vrob_chain_tag_i != vrob_entry0_tag_i));
       assert_never chain_path_c3_chain_invalid(pclk,preset_l,
vrob_retire_rdy_i & vrob_entry0_hazard_i & ~vrob_chain_valid_i &
~chain_path_b3 & ~chain_path_a3);
       assert_never chain_path_c4_issued(pclk,preset_l, vrob_retire_rdy_i
& vrob_entry0_hazard_i & (vrob_chain_double_i & ~vrob_entry0_double) &
vrob_chain_issued_i);
       // synopsys translate_on
     `endif
/////////////////////////////////////////////////////////////////////
/////////////////////////////
     //prioritize issue
     wire chain_issue_h = chain_path_hold;
     wire chain_issue_4 = chain_path_a4; // & ~chain_issue_hold;
mul_chain_valid_fe4_i is already masked by stall for timing purpose
     wire chain_issue_3 = (chain_path_c3 | chain_path_b3 | chain_path_a3)
& ~chain_issue_4 & ~chain_issue_h;
     wire chain_issue_2 = (chain_path_b2 | chain_path_a2) &
```

-continued

```
~chain_issue_4 & ~chain_issue_h & ~chain_issue_3;
    wire chain_issue_c = (chain_path_c3 & chain_issue_3);
    wire chain_issue_b = (chain_path_b3 & chain_issue_3) |
(chain_path_b2 & chain_issue_2);
    wire chain_issue_a = (chain_path_a4 & chain_issue_4) |
(chain_path_a3 & chain_issue_3) | (chain_path_a2 & chain_issue_2);
    wire chain_issue    = chain_path_hold | chain_path_a4 | chain_path_c3
| chain_path_b3 | chain_path_a3 | chain_path_b2 | chain_path_a2;
    assign vrob_chain_hazard_issue_o = chain_issue_3;
    assign mul_chain_issued_fe4_o = chain_issue_a | chain_path_a3; //
count hold as issued
    assign mul_chain_issued_fe5_o = chain_issue_b | chain_path_b3;
//count hold as issued
    assign vrob_addsub_chain_issue_o = chain_issue_2;
//////////////////////////////////////////////////////////////
/////////////////////////////
    wire load_chain_path_hold = chain_hazard_issue_rdy;
    wire [`VROB_RESULT_WIDTH-1:0] vrob_entry0_result_in =
{vrob_entry0_result_i[`VROB_RESULT_WIDTH-
1:64],vrob_entry0_result_h,vrob_entry0_result_1};
    wire [`VROB_RESULT_WIDTH-1:0] vrob_entry0_result_hold;
    DFFL_X #(`VROB_RESULT_WIDTH) chain_path_3_hold_ff
(vrob_entry0_result_hold, vrob_entry0_result_in, pclk,
load_chain_path_hold);
//////////////////////////////////////////////////////////////
/////////////////////////////
    wire [`VROB_RESULT_WIDTH-1:0] chain_result_hold;
    assign chain_result_hold[`VROB_FLAGS] = 4'b0;
    assign chain_result_hold[76:75] = 2'b0;
    wire chain_hold_c = vrob_chain_valid_i;
    wire chain_hold_b = mul_chain_valid_i & chain_hazard_fe5 &
(mul_chain_hazardtag_i == vrob_entry0_tag_i); //& ~chain_issued_fe5
    wire chain_hold_a = mul_chain_valid_fe4_i & chain_hazard_fe4 &
(mul_chain_hazardtag_fe4_i == vrob_entry0_tag_i);
`ifdef POWERCMP
wire pclk_load_chain_path_hold;
    `ifdef SYNOPSYS
    assign pclk_load_chain_path_hold = pclk & load_chain_path_hold;
    `else
    CLKGATE_EN pclk_load_chain_path_hold_gen( pclk_load_chain_path_hold,
pclk ,load_chain_path_hold, 1'b0 );
    `endif
`endif
`ifdef POWERCMP
    m4to1_muxflop_X_ne #(32) chain_result_hhold_muxff(
        .clk(pclk_load_chain_path_hold),
`else
    m4to1_muxflop_X #(32) chain_result_h_hold_muxff(
        .clk(pclk), .en(load_chain_path_hold),
`endif
    .q(chain_result_hold[63:32]),
    .d0(mul_result_fe4_i[63:32]), .s0(chain_hold_a),
    .d1(mul_result_i[63:32]), .s1(chain_hold_b),
    .d2(vrob_chain_result_i[63:32]), .s2(chain_hold_c),
    .d3(32'b0), .s3(1'b0)
    );
`ifdef POWERCMP
    m4to1_muxflop_X_ne #(32) chain_result_l_hold_muxff(
        .clk(pclk_load_chain_path_hold),
`else
    m4to1_muxflop_X #(32) chain_result_l_hold_muxff(
        .clk(pclk), .en(load_chain_path_hold),
`endif
    .q(chain_result_hold[31:00]),
    .d0(mul_result_fe4_i[31:00]), .s0(chain_hold_a),
    .d1(mul_result_i[31:00]), .s1(chain_hold_b),
    .d2(vrob_chain_result_i[31:00]), .s2(chain_hold_c),
    .d3(32'b0), .s3(1'b0)
    );
    wire muxff_dummy;
`ifdef POWERCMP
    m4to1_muxflop_X_ne #(8) addsub_chainexcept_hold_muxff(
        .clk(pclk_load_chain_path_hold),
`else
    m4to1_muxflop_X #(8) addsub_chainexcept_hold_muxff(
        .clk(pclk), .en(load_chain_path_hold),
`endif
    .q({chain_result_hold[`VROB_EXCEPTIONS],muxff_dummy}),
    .d0({mul_result_fe4_i[`VROB_EXCEPTIONS], 1'b0}       ),
```

```
        .s0(chain_hold_a),
            .d1({mul_result_i[`VROB_EXCEPTIONS], 1'b0}        ),
   .s1(chain_hold_b),
            .d2({vrob_chain_result_i[`VROB_EXCEPTIONS], 1'b0}        ),
   .s2(chain_hold_c),
            .d3({7'b0,1'b0}            ), .s3(1'b0)
        );
   wire chain_negate_hold;
   DFFL_X #(1) chain_negate_hold_ff(chain_negate_hold,
vrob_chain_negate_i, pclk, load_chain_path_hold);
   wire [`VFP_TAG_WIDTH-1:0] chain_tag_hold;
   DFFL_X #(`VFP_TAG_WIDTH) chain_tag_hold_ff(chain_tag_hold,
vrob_chain_tag_i, pclk, load_chain_path_hold);
   wire chain_double_hold;
   DFFL_X #(1) chain_double_hold_ff(chain_double_hold,
vrob_chain_double_i, pclk, load_chain_path_hold);
   wire chain_msc_hold;
   DFFL_X #(1) chain_msc_hold_ff(chain_msc_hold, 1'b0, pclk,
load_chain_path_hold);
//////////////////////////////////////////////////////////
//////////////////////////
// regular addsub issue
   wire addsub_double;
      wire addsub_fop_valid_vis = ((issue_a_vis_i &
issue_a_cntl_i[`FD_FUNC_ADDSUBD]) | chain_issue) & addsub_load_ve_i ;
      wire addsub_fop_valid;
      DFF_X #(1) addsub_fop_valid_ff (addsub_fop_valid,
addsub_fop_valid_vis, pclk, preset_1) ;
      assign addsub_h_valid_o = addsub_fop_valid & addsub_double;
      assign addsub_l_valid_o = addsub_fop_valid;
      assign issue_chain_issue_o = chain_issue;
   wire load_addsub_l_ve = addsub_fop_valid_vis;
      wire load_addsub_h_ve = addsub_fop_valid_vis;
      wire load_addsub_ve = addsub_fop_valid_vis;
   wire addsub_is_vob_src1 = vrob_src1_bypass_valid_i & ~chain_issue;
   wire addsub_is_vob_src2 = vrob_src2_bypass_valid_i & ~chain_issue;
   wire addsub_is_vrf_src1 = ~vrob_src1_bypass_valid_i & ~chain_issue;
   wire addsub_is_vrf_src2 = ~vrob_src2_bypass_valid_i & ~chain_issue;
//////////////////////////////////////////////////////////
//////////////////////////
      wire chain_issue_bh = chain_issue_b | chain_issue_h;
      wire [`VFP_TAG_WIDTH-1:0] chain_tag_bh = chain_issue_h ?
chain_tag_hold : mul_tag_i;
      wire chain_double_bh = chain_issue_h ? chain_double_hold :
mul_double_i;
      wire [6:0] chain_except_bh = chain_issue_h ?
chain_result_hold[`VROB_EXCEPTIONS] : mul_result_i[`VROB_EXCEPTIONS];
      wire chain_negate_bh = chain_issue_h ? chain_negate_hold :
mul_negate_i;
      assign addsub_double_o = {addsub_double, addsub_double,
addsub_double, addsub_double};
//combine tag and double to fit 5
`ifdef POWERCMP
wire pclk_load_addsub_ve;
wire pclk_load_addsub_h_ve;
wire pclk_load_addsub_l_ve;
   `ifdef SYNOPSYS
   assign pclk_load_addsub_ve = pclk & load_addsub_ve;
   assign pclk_load_addsub_h_ve = pclk & load_addsub_h_ve;
   assign pclk_load_addsub_l_ve = pclk & load_addsub_l_ve;
   `else
   CLKGATE_EN
pclk_load_addsub_ve_gen(pclk_load_addsub_ve,pclk,load_addsub_ve,1'b0);
   CLKGATE_EN
pclk_load_addsub_h_ve_gen(pclk_load_addsub_h_ve,pclk,load_addsub_h_ve,1'b0);
   CLKGATE_EN
pclk_load_addsub_l_ve_gen(pclk_load_addsub_l_ve,pclk,load_addsub_l_ve,1'b0);
   `endif
`endif
`ifdef POWERCMP
   m4to1_muxflop_X_ne #(5) addsub_tag_muxff(
      .clk(pclk_load_addsub_ve),
`else
   m4to1_muxflop_X #(5) addsub_tag_muxff(
      .clk(pclk), .en(load_addsub_ve),
`endif
      .q({addsub_tag_o, addsub_double} ),
      .d0({mul_tag_fe4_i,mul_double_fe4_i}        ),
   .s0(chain_issue_a),
      .d1({chain_tag_bh,chain_double_bh}        ),
```

-continued

```
      .s1(chain_issue_bh),
      .d2({vrob_chain_tag_i,vrob_chain_double_i}    ),
   .s2(chain_issue_c),
      .d3({issue_a_tag_i,issue_a_cntl_i[`FD_FPARA_DOUBLE}   ),
   .s3(~chain_issue));
   //combine chainexcept with msc to fit 8
`ifdef POWERCMP
   m4to1_muxflop_X_ne #(8) addsub_chainexcept_muxff(
      .clk(pclk_load_addsub_ve),
`else
   m4to1_muxflop_X #(8) addsub_chainexcept_muxff(
      .clk(pclk), .en(load_addsub_ve),
`endif
      .q({addsub_chainexcept_o,addsub_chain_negate}),
      .d0({mul_result_fe4_[`VROB_EXCEPTIONS], mul_negate_fe4_i}),
   .s0(chain_issue_a),
      .d1({chain_except_bh, chain_negate_bh}    ),
   .s1(chain_issue_bh),
      .d2({vrob_chain_result_i[`VROB_EXCEPTIONS], vrob_chain_negate_i}),
   .s2(chain_issue_c),
      .d3({7'b0,1'b0}              ), .s3(~chain_issue));
   assign addsub_msc_o = addsub_chain_negate;
   wire addsub_add_vis = (issue_a_cntl_i[`FD_FOP_FADD] | chain_issue) ;
// chain is alway add, except msc
   wire addsub_sub_vis = (issue_a_cntl_i[`FD_FOP_FSUB]) & ~chain_issue;
   DFFL_X #(1) addsub_add_ff (addsub_add_o, addsub_add_vis, pclk,
load_addsub_ve) ;
   DFFL_X #(1) addsub_sub_ff (addsub_sub_o, addsub_sub_vis, pclk,
load_addsub_ve) ;
   DFFL_X #(2) addsub_rmodes_ff (addsub_rmodes_o, vrf_rmodes_i, pclk,
load_addsub_ve) ; //!!check if fmxr issues only when vrob is empty
/////////////////////////////////////////////////////////////////
////////////////////////////
   wire [63:0] chain_result_s3 = addsub_is_vob_src2 ?
vrob_src2_bypass_result_i :
                                       chain_issue_h ?
chain_result_hold[63:0] : mul_result_i[63:0];
`ifdef POWERCMP
   m4to1_muxflop_X_ne #(32) addsub_fop2h_muxff(
      .clk(pclk_load_addsub_h_ve),
`else
   m4to1_muxflop_X #(32) addsub_fop2h_muxff(
      .clk(pclk), .en(load_addsub_h_ve),
`endif
      .q(addsub_fop2h_o),
      .d0(vrf_rd_value1_i    [63:32]),    .s0(addsub_is_vrf_src2),
      .d1(mul_result_fe4_i   [63:32]),    .s1(chain_issue_a),
      .d2(vrob_chain_result_i [63:32]),   .s2(chain_issue_c),
      .d3(chain_result_s3    [63:32]),    .s3(chain_issue_h | chain_issue_b
| addsub_is_vob_src2)
   );
`ifdef POWERCMP
   m4to1_muxflop_X_ne #(32) addsub_fop2l_muxff(
      .clk(pclk_load_addsub_l_ve),
`else
   m4to1_muxflop_X #(32) addsub_fop2l_muxff(
      .clk(pclk), .en(load_addsub_l_ve),
`endif
      .q(addsub_fop2l_o),
      .d0(vrf_rd_value1_i    [31:00]),    .s0(addsub_is_vrf_src2),
      .d1(mul_result_fe4_i   [31:00]),    .s1(chain_issue_a),
      .d2(vrob_chain_result_i [31:00]),   .s2(chain_issue_c),
      .d3(chain_result_s3    [31:00]),    .s3(chain_issue_h | chain_issue_b
| addsub_is_vob_src2)
   );
/////////////////////////////////////////////////////////////////
////////////////////////////
   wire [63:0] chain_dest_s2 = addsub_is_vob_src1 ?
vrob_src1_bypass_result_i : addsub_result_i;
      wire chain_issue_4h = chain_issue_4 | chain_dpsp_4h_hold;
      wire chain_issue_4l = chain_issue_4 | chain_dpsp_4l_hold;
      wire [31:0] chain_dest_s3_l = chain_issue_h ?
vrob_entry0_result_hold[31:00] : vrob_entry0_result_l;
      wire [31:0] chain_ dest_s3_h = chain_issue_h ?
vrob_entry0_result_hold[63:32] : vrob_entry0_result_h;
   wire [31:0] addsub_fop1h;
   wire [31:0] addsub_fop1l;
`ifdef POWERCMP
   m4to1_muxflop_X_ne #(32) addsub_fop1h_muxff(
      .clk(pclk_load_addsub_h_ve),
```

```
`else
   m4to1_muxflop_X #(32) addsub_fop1h_muxff(
     .clk(pclk), .en(load_addsub_h_ve),
`endif
     .q(addsub_fop1h),
     .d0(vrf_rd_value0_i    [63:32]),    .s0(addsub_is_vrf_src1),
     .d1(vrfrd_value2_i     [63:32]),    .s1(chain_issue_4h) ,
     .d2(chain_dest_s2      [63:32]),
.s2(addsub_is_vob_src1|chain_issue_2),
     .d3(chain_dest_s3_h), .s3(chain_issue_3|(chain_issue_h &
~chain_dpsp_4h_hold))
  );
`ifdef POWERCMP
   m4to1_muxflop_X_ne #(32) addsub_fop1l_muxff(
     .clk(pclk_load_addsub_l_ve),
`else
   m4to1_muxflop_X #(32) addsub_fop1l_muxff(
     .clk(pc1k), .en(load_addsub_l_ve),
`endif
     .q(addsub_fop1l),
     .d0(vrf_rd_value0_i    [31:00]),    .s0(addsub_is_vrf_src1),
     .d1(vrf_rd_value2_i    [31:00]),    .s1(chain_issue_4l),
     .d2(chain_dest_s2      [31:00]),
.s2(addsub_is_vob_src1|chain_issue_2),
     .d3(chain_dest_s3_1), .s3(chain_issue_3|(chain_issue_h &
~chain_dpsp_4l_hold))
  );
////////////////////////////////////////////////////////////
///////////////////////////
   assign addsub_fop1h_o[30:0] = addsub_fop1h[30:0];
   assign addsub_fop1l_o[30:0] = addsub_fop1l[30:0];
   assign addsub_fop1h_o[31] =
addsub_fop1h[31]^(addsub_double&addsub_chain_negate);
   assign addsub_fop1l_o[31] =
addsub_fop1l[31]^(~addsub_double&addsub_chain_negate);
   // synopsys translate_off
   `ifdef SVA
      assert_one_hot
addsub_fop1h_muxf_sel(pclk,preset_1,{addsub_is_vob_src1,addsub_is_vob_
src2,chain_issue_2,chain_issue_3h,chain_issue_4h, ~load_addsubh_ve});
    ~endif
    // synopsys translate_on
endmodule
```

The following module contains the hazard detection scheme:

```
////////////////////////////////////////////////////////////
///////////////
module vrob_chain_entry (
   input       [`VROB_CHAIN_HAZPTR_WIDTH-1:0]  vrob_oscnt_i,          //dependant
offset pointer counter in
   input                                       vrob_MACdep_on_i,
   input                                       vmac_chk_i,
   input       [`VFP_TAG_WIDTH-1:0]            vmac_tag_i,
   input       [4:0]                           vmac_sd_i,
   input                                       vmac_dp_i,             //double
precision flag
   input                                       vrob_retire_i,
   input       [`VFP_TAG_WIDTH-1:0]            vrob_tag_i,
   input       [`VROB_CNTL_WIDTH-1:0]          vrob_cntl_i,
   input                                       vrob_vbit_i,
   input                                       vrob_entry_open_i,
   input       [`VROB_CHAIN_WIDTH-1:0]         vrob_chain_ret_i,
   input                                       vrob_msc_i,
   input       [`VFP_TAG_WIDTH-1:0]            vrob_mul_tag_i,
   input                                       vrob_mul_done_i,
   input                                       vrob_chain_issued_i,
   input       [`VFP_TAG_WIDTH-1:0]            vrob_addsub_tag_i,
   input                                       chain_addsub_issue_i,
   output      [`VROB_CHAIN_HAZPTR_WIDTH-1:0]  vrob_oscnt_o,
   output                                      vrob_MACdep_on_o,
   output                                      vrob_chain_dep_o,
   output      [`VFP_TAG_WIDTH-1:0]            vrob_deptag_o,
   output      [`VROB_CHAIN_WIDTH-1:0]         vrob_chain_ret_o,
   output      [`VROB_CHAIN_WIDTH-1:0]         vrob_chain_o
```

```
         input                          pclk,
         input                          preset_l
);
      wire      [`VROB_CHAIN_WIDTH-1:0] vrob_chain;
      wire      [`VROB_CHAIN_WIDTH-1:0] vrob_chain_retire0;
      wire      MACentry = (vmac_tag_i == vrob_tag_i) & vrob_vbit_i;
      wire      [4:0] vrob_dest = vrob_cntl_i[`VROB_INDEX0];
      wire      SdMatch = (vmac_sd_i[4:1] == vrob_dest[4:1]) &
  (vrob_cntl_i[`VROB_DP] | vmac_dp_i | (vmac_sd_i[0] ~^
vrob_dest[0]));
  /* 0in
     create_wire ~var MACentry_implies_SdMatch;
     create_assign ~var (~MACentry | SdMatch) ~var_out
MACentry_implies_SdMatch ;
     always ~var MACentry_implies_SdMatch;
  */
     assign vrob_oscnt_o = MACentry ? 3'b001 : vrob_oscnt_i +1;
     assign vrob_MACdep_on_o = MACentry | (vrob_MACdep_on_i & ~SdMatch);
     assign vrob_chain_dep_o = vrob_MACdep_on_i & SdMatch & vmac_chk_i;
     assign vrob_deptag_o = vrob_tag_i &
{`VFP_TAG_WIDTH{vrob_chain_dep_o}};
     wire vrob_mul_done = (vrob_mul_tag_i == vrob_tag_i) & vrob_mul_done_i
& vrob_vbit_i;
     wire chain_addsub_issued = (vrob_addsub_tag_i == vrob_tag_i) &
chain_addsub_issue_i & vrob_vbit_i;
     assign vrob_chain_retire0[`VROB_CHAIN_NEGATE] =
vrob_chain[`VROB_CHAIN_NEGATE] | (vrob_mul_done & vrob_msc_i); //from
end of mul not from issue
     assign vrob_chain_retire0[`VROB_CHAIN_MUL_DONE] =
vrob_chain[`VROB_CHAIN_MUL_DONE] | (vrob_mul_done); // update at mul
retire
     assign vrob_chain_retire0[`VROB_CHAIN_ISSUED] =
vrob_chain[`VROB_CHAIN_ISSUED] | (vrob_mul_done & vrob_chain_issued_i);
//update at mul retire
     assign vrob_chain_retire0[`VROB_CHAIN_HAZARD] =
(vrob_chain[`VROB_CHAIN_HAZARD] | vrob_chain_dep_o) &
~chain_addsub_issued;
     assign vrob_chain_retire0[`VROB_CHAIN_HAZPTR] = vrob_chain_dep_o ?
vrob_oscnt_i : vrob_chain[`VROB_CHAIN_HAZPTR] ;
     wire       [`VROB_CHAIN_WIDTH-1:0] vrob_chain_in = vrob_retire_i ?
vrob_chain_ret_i : {`VROB_CHAIN_WIDTH{~vrob_entry_open_i}} &
vrob_chain_retire0;
     assign vrob_chain_ret_o = {`VROB_CHAIN_WIDTH{~vrob_entry_open_i}} &
vrob_chain_retire0;
     assign vrob_chain_o = vrob_chain;
     DFF_X #(`VROB_CHAIN_WIDTH) vrob_chain_ff
         (vrob_chain, vrob_chain_in, pclk, preset_l);
endmodule
  . . . . . .
      wire      [`VROB_CHAIN_HAZPTR_WIDTH-1:0] vrob_oscnt[8:0];
      wire                                      vrob_MACdep_on[8:0];
      wire      [`VROB_CHAIN_WIDTH-1:0]         vrob_chain_ret[8:0];
      wire      [`VROB_CHAIN_WIDTH-1:0]         vrob_chain[7:0];
      wire                                      vrob_chain_dep[7:0];
      wire      [`VFP_TAG_WIDTH-1:0]            vrob_deptag[7:0];
      wire      [`VFP_TAG_WIDTH-1:0]            vrob_tag[7:0];
      wire      [`VROB_CNTL_WIDTH-1:0]          vrob_cntl[7:0];
      wire                                      vrob_vbit[7:0];
      wire      [`VROB_RESULT_WIDTH-1:0]        vrob_result[7:0];
     assign vrob_tag[0] = vrob_tag0;
     assign vrob_tag[1] = vrob_tag1;
     assign vrob_tag[2] = vrob_tag2;
     assign vrob_tag[3] = vrob_tag3;
     assign vrob_tag[4] = vrob_tag4;
     assign vrob_tag[5] = vrob_tag5;
     assign vrob_tag[6] = vrob_tag6;
     assign vrob_tag[7] = vrob_tag7;
     assign vrob_cntl[0] = vrob_cntl0;
     assign vrob_cntl[1] = vrob_cntl1;
     assign vrob_cntl[2] = vrob_cntl2;
     assign vrob_cntl[3] = vrob_cntl3;
     assign vrob_cntl[4] = vrob_cntl4;
     assign vrob_cntl[5] = vrob_cntl5;
     assign vrob_cntl[6] = vrob_cntl6;
     assign vrob_cntl[7] = vrob_cntl7;
     assign vrob_vbit[0] = vrob_vbit0;
     assign vrob_vbit[1] = vrob_vbit1;
     assign vrob_vbit[2] = vrob_vbit2;
     assign vrob_vbit[3] = vrob_vbit3;
     assign vrob_vbit[4] = vrob_vbit4;
```

```
    assign vrob_vbit[5] = vrob_vbit5;
    assign vrob_vbit[6] = vrob_vbit6;
    assign vrob_vbit[7] = vrob_vbit7;
    assign vrob_result[0] = vrob_result0;
    assign vrob_result[1] = vrob_result1;
    assign vrob_result[2] = vrob_result2;
    assign vrob_result[3] = vrob_result3;
    assign vrob_result[4] = vrob_result4;
    assign vrob_result[5] = vrob_result5;
    assign vrob_result[6] = vrob_result6;
    assign vrob_result[7] = vrob_result7;
assign vrob_oscnt[8] = `VROB_CHAIN_HAZPTR_WIDTH'b0;
assign vrob_MACdep_on[8] = 1'b0;
assign vrob_chain_ret[8] = `VROB_CHAIN_WIDTH'b0;
wire [7:0] chain_dep ; //= vrob_chain_dep[7:0];
wire mul_chain_done = chain_valid_i;    //& vcdb_vbit3;
genvar i;
generate for (i=0; i<8; i=i+1) begin: rob_chain_entries
      vrob_chain_entry entry(
        .vrob_oscnt_i          (vrob_oscnt[i+1]),
        .vrob_MACdep_on_i      (vrob_MACdep_on[i+1]),
        .vmac_chk_i            (chain_chk_i),
        .vmac_tag_i            (chain_tag_i),
        .vmac_sd_i             (chain_dest_i),
        .vmac_dp_i             (chain_double_i),
        .vrob_retire_i         (vrob_retire1),
        .vrob_entry_open_i     (vrob_state[i]),
        .vrob_tag_i            (vrob_tag[i]),
        .vrob_cntl_i           (vrob_cntl[i]),
        .vrob_vbit_i           (vrob_vbit[i]),
        .vrob_chain_ret_i      (vrob_chain_ret[i+1]),
        .vrob_msc_i            (chain_msc_i),
        .vrob_mul_tag_i        (vcdb_tag3),
        .vrob_mul_done_i       (mul_chain_done),
        .vrob_chain_issued_i      (chain_issued_i),
        .vrob_addsub_tag_i        (vcdb_tag0),
        .chain_addsub_issue_i     (chain_addsub_issue_i),
        .vrob_oscnt_o          (vrob_oscnt[i]),
        .vrob_MACdep_on_o      (vrob:MACdep_on[i]),
        .vrob_chain_dep_o      (vrob_chain_dep[i]),
        .vrob_deptag_o         (vrob_deptag[i]),
        .vrob_chain_ret_o      (vrob_chain_ret[i]),
        .vrob_chain_o          (vrob_chain[i]),
        .pclk       (pclk),
        .preset_l   (preset_l)
      );
      assign chain_dep[i] = vrob_chain_dep[i];
    end
endgenerate
assign chain_hazard_o = | chain_dep;
wire [`VFP_TAG_WIDTH-1:0] chain_hazardtag_o = vrob_deptag[7] |
vrob_deptag[6] | vrob_deptag[5] |
      vrob_deptag[4] | vrob_deptag[3] | vrob_deptag[2]| vrob_deptag[1]
| vrob_deptag[0];
wire [2:0] depptr = vrob_chain[0] `VROB_CHAIN_HAZPTR];
    assign chain_result_o =   depptr[2] ? depptr[1] ? depptr[0] ?
    vrob_result[7]
                                                                  :
    vrob_result[6]
                                                        : depptr[0] ?
    vrob_result[5]
                                                                  :
    vrob_result[4]
                                            : depptr[1] ? depptr[0] ?
    vrob_result[3]
                                                                  :
    vrob_result[2]
                                                        : depptr[0] ?
    vrob_result[1]
                                                                  :
`VROB_RESULT_WIDTH'b0; //vrob_result[0];
    assign chain_tag_o = depptr[2] ? depptr[1] ? depptr[0] ?
    vrob_tag[7]
                                                                  :
    vrob_tag[6]
                                                        : depptr[0] ?
    vrob_tag[5]
                                                                  :
    vrob_tag[4]
                                            : depptr[1] ? depptr[0] ?
```

```
vrob_tag[3]
                                                                                    :
vrob_tag[2]
                                                                    : depptr[0] ?
vrob_tag[1]
                                                                                    :
`VROB_TAG_WIDTH'b0; //vrobcntl[0];
    wire [`VROB_CNTL_WIDTH-1:0] chain_cntl =
                         depptr[2] ? depptr[1] ? depptr[0] ? vrob_cntl[7]
vrob_cntl[6]
                                                                    : depptr[0] ?
vrob_cntl[5]
                                                                                    :
vrob_cntl[4]
                                                     : depptr[1] ? depptr[0] ?
vrob_cntl[3]
                                                                                    :
vrob_cntl[2]
                                                                    : depptr[0] ?
vrob_cntl[1]
                                                                                    :
`VROB_CNTL_WIDTH'b0; //vrob_cntl[0];
    assign chain_double_o = chain_cntl[`VROB_DP];
    assign chain_odd_dest_o = chain_cntl[6];
    wire [`VROB_CHAIN_WIDTH-1:0] chain_chain =
                         depptr[2] ? depptr[1] ? depptr[0] ? vrob_chain[7]
                                                                                    :
vrob_chain[6]
                                                                    : depptr[0] ?
vrob_chain[5]
                                                                                    :
vrob_chain[4]
                                                     : depptr[1] ? depptr[0] ?
vrob_chain[3]
                                                                                    :
vrob_chain[2]
                                                                    : depptr[0] ?
vrob_chain[1]
`VROB_CHAIN_WIDTH'b0; //vrob_chain[0];
    assign chain_negate_o = chain_chain[`VROB_CHAIN_NEGATE];
    assign chain_issued_o = chain_chain[`VROB_CHAIN_ISSUED];
    assign chain_valid_o = chain_chain[VROB_CHAIN_MUL_DONE];
         wire [`VROB_CHAIN_WIDTH-1:0] vrob_chain0 = vrob_chain[0];
         wire [`VROB_CHAIN_WIDTH-1:0] vrob_chain1 = vrob_chain[1];
         wire [`VROB_CHAIN_WIDTH-1:0] vrob_chain2 = vrob_chain[2];
         wire [`VROB_CHAIN_WIDTH-1:0] vrob_chain3 = vrob_chain[3];
         wire [`VROB_CHAIN_WIDTH-1:0] vrob_chain4 = vrob_chain[4];
         wire [`VROB_CHAIN_WIDTH-1:0] vrob_chain5 = vrob_chain[5];
         wire [`VROB_CHAIN_WIDTH-1:0] vrob_chain6 = vrob_chain[6];
         wire [`VROB_CHAIN_WIDTH-1:0] vrob_chain7 = vrob_chain[7];
    assign chain_entry0_tag_o = vrob_tag0;
    assign chain_entry0_hazard_o = vrob_chain0[`VROB_CHAIN_HAZARD];
    assign chain_entry0_result_o = vrob_result0;
    assign chain_entry0_cntl_o = vrob_cntl0;
```

What is claimed is:

1. A logic circuit for processing a floating point multiply-accumulate (FMAC) instruction, the logic circuit comprising:
   a register file;
   a hazard-checking block configured to detect whether the FMAC instruction contains a potential hazard that can cause a potential error in execution of the FMAC instruction due to data dependency;
   a multiplier configured to (i) receive an operand S1 and an operand S2 from the register file, (ii) multiply the operand S1 and the operand S2 for the FMAC instruction, and (iii) in response to multiplying the operand S1 and the operand S2, produce a resultant operand St;
   a reorder buffer configured to store and reorder entries corresponding to a plurality of FMAC instructions, including the FMAC instruction;
   an adder configured to (i) add the resultant operand St and an operand Sd, and (ii) in response to adding the resultant operand St and the operand Sd, produce another resultant operand that represents a result of the FMAC instruction;
   a plurality of Sd paths comprising (i) a first Sd path from the register file to provide the operand Sd to the adder, (ii) a second Sd path from the adder to provide the operand Sd to the adder, (iii) a third Sd path from the reorder buffer to provide the operand Sd to the adder, and (iv) a fourth Sd path from a register buffer of the adder to provide the operand Sd to the adder; and
   a control unit configured to select a Sd path, from the plurality of Sd paths, to provide the operand Sd to the adder,
   wherein the control unit is further configured to
      in response to a determination by the hazard-checking block that the FMAC instruction does not contain a potential hazard, select the first Sd path to provide the operand Sd to the adder, and in response to a determination by the hazard-checking block that the FMAC instruction contains a potential hazard, select, to provide the operand Sd to the adder, one of (i) the second Sd path, (ii) the third Sd path, and (iii) the fourth Sd path.

2. The logic circuit according to claim 1, wherein:
the FMAC instruction is one of the plurality of FMAC instructions;
the plurality of FMAC instructions include corresponding tags in the reorder buffer; and
the hazard checking block is further configured to detect the potential hazard for the FMAC instruction based at least on a determination that the reorder buffer contains another entry not associated with the FMAC instruction that has an identical tag.

3. The logic circuit according to claim 2, wherein the resultant operand St is provided to the adder either (i) from the multiplier on a first St path or (ii) from a register buffer of the multiplier on a second St path.

4. The logic circuit according to claim 2, wherein provision of the resultant operand St on the first St path has a lower priority than obtaining the resultant operand St on the second St path.

5. The logic circuit according to claim 1, wherein an operand of an oldest instruction in the reorder buffer is sent as an operand to the adder.

6. The logic circuit according to claim 1, wherein:
the operand St is supplied to the adder by one of (i) a first St path from the multiplier, (ii) a second St path from a register buffer of the multiplier, or (iii) a third St path from the reorder buffer; and
the one of the first, second, and third St paths is selected based at least in part on (i) a priority of the St paths and (ii) a state of the plurality of instructions having entries in the reorder buffer.

7. The logic circuit according to claim 6, wherein the priority of the St paths includes that the first St path has a higher priority than both the second St path and the third St path.

8. The logic circuit according to claim 7, wherein:
the state of the plurality of instructions includes a state that the multiplier has written an output of the multiplication of the operand S1 and the operand S2 to the reorder buffer; and
the operand St is supplied to the adder on a path other than the third St path.

9. The logic circuit according to claim 1, wherein the control unit is further configured to:
in response to the determination by the hazard-checking block that the FMAC instruction contains the potential hazard, select one of the second Sd path, the third Sd path and the fourth Sd path based further on one or more of (i) a priority of the second Sd path, (ii) a priority of the third Sd path, (iii) a priority of the fourth Sd path, and (iv) a state of the plurality of instructions having entries in the reorder buffer.

10. The logic circuit according to claim 9, wherein the priority of the third Sd path is higher than each of the priority of the second Sd path and the priority of the fourth Sd path.

11. The logic circuit according to claim 9, wherein the state of the plurality of instructions includes a state that (i) an Sd value in a particular entry of the reorder buffer has previously issued to the adder, and (ii) a corresponding instruction for the particular entry has already completed, resulting in the third Sd path from the reorder buffer being prohibited from supplying the operand Sd to the adder.

12. The logic circuit of according to claim 9, wherein the state of the plurality of instructions includes multiple consecutive uses of the first Sd path thereby resulting in retirable instructions remaining in the reorder buffer.

13. A method for processing a floating instruction, the method comprising:
storing operands S1 and S2 for the floating point instruction in a register file;
detecting whether the floating point instruction contains a potential hazard that can cause a potential error in execution of the FMAC instruction due to data dependency;
multiplying the operand S1 and the operand S2 from the register file to produce a resultant operand St;
selecting a Sd path, from a plurality of Sd paths, to provide an operand Sd to an adder, wherein the plurality of Sd paths comprises (i) a first Sd path from the register file to provide the operand Sd to the adder, (ii) a second Sd path from the adder to provide the operand Sd to the adder, (iii) a third Sd path from a reorder buffer to provide the operand Sd to the adder, and (iv) a fourth Sd path from a register buffer of the adder to provide the operand Sd to the adder, and wherein selecting the Sd path from the plurality of Sd paths further comprises
in response to detecting that the floating point instruction does not contain a potential hazard, selecting the first Sd path to provide the operand Sd to the adder, and
in response to detecting that the floating point instruction contains a potential hazard, selecting, to provide the operand Sd to the adder, one of (i) the second Sd path, (ii) the third Sd path, and (iii) the fourth Sd path;
supplying the operand Sd to the adder by the selected Sd path;
adding the resultant operand St and the operand Sd to produce another resultant operand that represents a result of the floating point instruction;
storing and reordering entries corresponding to a plurality of floating point instructions, including the floating point instruction, in the reorder buffer; and
selecting an output value for the floating point instruction from the reorder buffer.

14. The method according to claim 13, wherein ones of the plurality of floating point instructions include a tag, and wherein detecting whether the floating point instruction contains a potential hazard includes determining whether another floating point instruction has an entry with an identical tag.

15. The method according to claim 13, wherein the operand Sd is an operand of the oldest instruction in the reorder buffer.

* * * * *